US008309911B2

(12) United States Patent
Wells

(10) Patent No.: US 8,309,911 B2
(45) Date of Patent: Nov. 13, 2012

(54) METHODS AND APPARATUS FOR FILLING AN ION DETECTOR CELL

(75) Inventor: Gregory J. Wells, Fairfield, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 376 days.

(21) Appl. No.: 12/547,335

(22) Filed: Aug. 25, 2009

(65) Prior Publication Data

US 2011/0049346 A1 Mar. 3, 2011

(51) Int. Cl.
*B01D 59/44* (2006.01)

(52) U.S. Cl. .......................... 250/281; 250/282; 250/292

(58) Field of Classification Search ................... 250/281
See application file for complete search history.

(56) References Cited

U.S. PATENT DOCUMENTS

| | | | | |
|---|---|---|---|---|
| 4,686,365 | A * | 8/1987 | Meek et al. | 250/281 |
| 5,847,386 | A * | 12/1998 | Thomson et al. | 250/288 |
| 6,130,426 | A | 10/2000 | Laukien et al. | |
| 6,417,511 | B1 * | 7/2002 | Russ et al. | 250/292 |
| 7,138,624 | B2 * | 11/2006 | Kato | 250/282 |
| 7,211,794 | B2 * | 5/2007 | Malek et al. | 250/291 |
| 7,482,581 | B2 * | 1/2009 | Lange et al. | 250/282 |
| 7,557,343 | B2 * | 7/2009 | Hansen et al. | 250/292 |
| 2008/0251715 | A1 | 10/2008 | Nikolaev et al. | |
| 2009/0159791 | A1 | 6/2009 | Wells | |
| 2010/0038530 | A1 * | 2/2010 | Giles et al. | 250/283 |

FOREIGN PATENT DOCUMENTS

| | | |
|---|---|---|
| EP | 1688986 | 8/2006 |
| GB | 2 399 450 A | 9/2004 |

OTHER PUBLICATIONS

Extended EPO Search Report from Corresponding European Patent Application No. 10008853.3-1232, 8 pgs. (Jun. 7, 2011).

* cited by examiner

*Primary Examiner* — Phillip A Johnston

(57) ABSTRACT

In a mass spectrometer, a dual stage axial extraction field is applied to transport ions from an accumulator to a detector cell. Ions of a same mass may be transported to the detector cell or a point axially preceding the detector cell at the same time. This may be done by selecting the relative strengths of a first axial electric field applied to the accumulator and a second axial electric field applied to a shutter located at an exit end of the accumulator. This may also be done by selecting relative axial lengths of the accumulator, shutter, and an ion guide located at an exit end of the shutter. A dual stage decelerating field may also be applied to slow ions down prior to and after entering the detector cell.

18 Claims, 12 Drawing Sheets

METHODS AND APPARATUS FOR FILLING AN ION DETECTOR CELL

FIELD OF THE INVENTION

The present invention relates generally to filling a mass analyzer with ions, particularly in a mass spectrometry apparatus that includes linearly arranged ion-processing components.

BACKGROUND OF THE INVENTION

Ion trapping mass spectrometers utilizing magnetic confinement of the ions in the radial direction and DC voltages for axial confinement are known as Penning Traps or ion cyclotron resonance mass spectrometers (ICR-MS). Ions in the trapping cell oscillate at a frequency that depends on the magnetic field strength and the mass-to-charge (m/z) ratio of the ion. Ions trapped in the detector cell can absorb energy by resonance excitation from an applied electrical field alternating at the frequency of oscillation of the ions, and can be detected by measuring the electromotive force (EMF) induced in the trapping cell walls due to the oscillating charge of the ions by means known in the art. Fourier Transform Mass Spectrometers (FTMS) detect the masses of ions by exciting the ions in the detector cell by means of a voltage pulse containing a range of frequencies or a rapid frequency scan so as to increase the energy of all of the ions present in the cell when the excitation frequency matches the ion oscillation frequency. The detected voltage is a complex mixture of frequencies that corresponds to the natural oscillation of all of the ions that were excited. A Fourier Transform of the time domain voltage results in a frequency domain spectrum that directly represents the mass and relative abundances of the ions present.

Ions are generally formed in an ion source located outside of the magnetic field and must be accumulated in an ion trapping device and then transported into the detector cell and in the magnetic field. Since there is no inherent means of increasing the number of charged particles that are detected when detecting ions by induced EMF, as is common in other types of mass spectrometers which utilize electron multipliers, it is necessary to have a large-volume detector cell that can hold several million ions. Typically at least 100 ions are required for a minimum detectable voltage. It is known in the art to accumulate ions in a radio frequency (RF) ion trap comprising a multipole electrode structure, such as a hexapole or octopole, having RF voltages applied to the electrodes to confine the ions in the radial direction. DC voltages applied to apertures located on the axis of the accumulation trap and at the entrance and exit ends of the trap confine the ions in the axial direction.

FIG. 1 is a schematic view of a typical FTMS system 100. In this schematic view, ions travel in a general direction from left to right along an axis about which various ion-controlling devices are arranged. The FTMS system 100 generally includes an ion source (not shown) followed by, in succession along the axis, an ion accumulator 102, a shutter assembly 104, an ion guide 106, an ion decelerator 108, and an ion detector cell 110. The FTMS system 100 also includes a housing 112 that encloses the ion accumulator 102, the shutter assembly 104, the ion guide 106, the ion decelerator 108 and the ion detector cell 110. The housing 112 defines a first vacuum region (or pumping stage) 114 and a second vacuum region (or pumping stage) 116 adjoined at a boundary 118 having a differential pumping aperture 120 located at the axis. The ion accumulator 102 and the shutter assembly 104 are positioned in the first pumping region 114 and the ion guide 106, the ion decelerator 108 and the ion detector cell 110 are positioned in the second pumping region 116. Suitable vacuum pumps 122, 124 respectively maintain the first vacuum region 114 at a vacuum pressure $P_1$ and the second vacuum region 116 at a vacuum pressure $P_2$ lower than $P_1$. The FTMS system 100 further includes a suitable magnet assembly 126 (e.g., including a superconducting magnet) that coaxially surrounds the ion detector cell 110 and may also surround the ion decelerator 108 and part of the ion guide 106.

FIG. 2A is a side (lengthwise) view of the ion accumulator 102, shutter assembly 104 and ion guide 106 illustrated in FIG. 1. The ion accumulator 102 and the ion guide 106 are typically structured as linear multipole electrode sets operating as ion traps. Each electrode set includes a set of parallel electrodes 232, 234 extending along the axis and circumferentially spaced from each other about the axis at radial distances in the transverse plane orthogonal to the axis, thereby circumscribing an axially elongated interior space in which ions may be confined and through which the ions travel. Typically, each electrode set includes six electrodes 232, 234 (hexapole arrangement) or eight electrodes 232, 234 (octopole arrangement). RF voltage sources (not shown) are connected to the electrodes 232, 234 in a known manner so as to apply a linear (two-dimensional) RF trapping field that confines the radial motions of the ions to a region along the axis. Respective lenses 236, 238 serve as the ion entrance to and ion exit from the ion accumulator 102. Another lens 242 serves as the ion entrance to the ion guide 106 and yet another lens (not shown) serves as the ion exit from the ion guide 106. The lenses 236, 238, 242 are typically plates with apertures located at the axis and are connected to DC voltage sources (not shown). The shutter assembly 104 is typically a series of lenses 244 configured to direct the ions through the differential pumping aperture 120 located between the two vacuum regions 114 and 116 (FIG. 1). The shutter assembly 104 also typically includes a movable, mechanical shutter element (not shown). As an alternative to an RF multipole arrangement, the ion guide 106 may be provided as a series of axially spaced DC lenses that would likewise operate to confine the ions in the radial direction as the ions travel to the ion detector cell 110.

In operation, ions 248 produced from a molecular sample in the ion source are transmitted in the ion accumulator 102. In the ion accumulator 102, the ions are confined in the radial direction by the RF voltages applied to the electrodes 232 and in the axial direction by the DC voltages applied to the entrance lens 236 and the exit lens 238. FIG. 2B illustrates typical DC voltages applied to the ion accumulator 102, shutter assembly 104 and ion guide 106 when trapping ions in the ion accumulator 102. Assuming the ions are positively charged, a positive DC voltage (e.g., +5 V) is applied to the entrance lens 236, no DC voltage is applied to the electrodes 232 of the ion accumulator 102, a relatively higher DC voltage (e.g., +20 V) is applied to the exit lens 238, and a negative DC voltage (e.g., −7 V) is applied to the electrodes 234 of the ion guide 106. The low potential barrier at the entrance to the ion accumulator 102 allows the ions to enter the ion accumulator 102. The large potential barrier at the exit of the ion accumulator 102 prevents ions from passing completely through the ion accumulator 102 while the ions are being accumulated therein. The addition of a damping gas such as helium allows for the removal of excess kinetic energy by collisions so that the ions will not escape from the ion accumulator 102 by leaving through the aperture of the entrance lens 236.

FIGS. 3A and 3B illustrate the extraction of the ions from the ion accumulator 102. FIG. 3A is a side (lengthwise) view of the ion accumulator 102, shutter assembly 104 and ion guide 106 similar to FIG. 2A, and FIG. 3B illustrates typical DC voltages applied to the ion accumulator 102, shutter assembly 104 and ion guide 106 when extracting the trapped ions from the ion accumulator 102. Ions are removed from the ion accumulator 102 by reducing the potential barrier at the exit lens 238, for example by changing the DC voltage on the exit lens 238 from +20 V to −20 V as shown in FIG. 3B. Additionally, in prior art devices a large number of ions are accumulated so as to form space charge repulsion between the ions. The space charge repulsion, along with the attractive potential from the exit lens 238 of the ion accumulator 102, causes ions to be removed from the ion accumulator 102 and directed through the shutter assembly 104 and into the ion guide 106. During ion extraction from the ion accumulator 102, the shutter element of the shutter assembly 104 opens to allow ions to pass and closes after the ions have passed in order to reduce the gas load on the vacuum pump 124 in the second pumping region 116 (FIG. 1), thereby allowing lower pressures to be maintained during the succeeding mass analysis time. After traversing the differential pumping aperture 120 (FIG. 1), the ions then travel through the ion guide 106. Ions 250 exiting the ion guide 106 are decelerated and transmitted into the magnetic field and into the ion detector cell 110.

FIG. 4A is a side (lengthwise) view of the ion decelerator 108 and ion detector cell 110 illustrated in FIG. 1, as well as part of the ion guide 106 preceding the ion detector cell 110. The ion detector cell 110 typically includes three axially spaced electrodes 454, 456, 458 (cylindrical rings or plates) with respective apertures aligned along the axis, and trapping plates 108, 462 positioned at the respective axial ends. The trapping plate 108 at the ion entrance is typically a lens with an aperture, and typically serves as the ion decelerator 108. The center electrode 456 is further segmented into radial quadrants (not shown) so as to have pairs of opposing sections that can be utilized as transmitting and receiving electrodes for ion detection and mass measurement. In addition to applying alternating frequency voltages to the electrodes 454, 456, 458 for ion detection, each electrode 454, 456, 458 can also have a DC potential applied thereto. FIG. 4B illustrates typical DC voltages applied to the various electrodes of the ion guide 106, ion decelerator 108 and ion detector cell 110 when admitting ions in the ion detector cell 110, and also schematically illustrates the trajectory of the ions during this time. A negative DC voltage (e.g., −7 V) is applied to the electrodes 234 of the ion guide 106 as noted above, no DC voltage is applied to the ion decelerator 108, a positive DC voltage (e.g., +0.2 V) is applied to the first inner electrode 454, no DC voltage is applied to the center electrode 456, a positive DC voltage (e.g., +0.2 V) is applied to the second inner electrode 458, and a positive DC voltage (e.g., +15 V) is applied to the distal trapping plate 462. The voltage at the distal end of the ion detector cell 110 has a repulsive DC potential applied to prevent the in-coming ions from escaping the detector cell 110 at that end, as indicated schematically by the ion trajectory in FIG. 4B. Ions are confined in the radial direction by the magnetic field. The potential at the entrance (proximate) end of the ion detector cell 110 is reduced so as to allow ions from the accumulator trap 102 to enter the detector cell 110 similar to what was described above for the accumulator trap 102. Once the packet of ions has entered the ion detector cell 110, the potential at the entrance is increased so as to prevent the ions in the detector cell 110 from escaping from the entrance end. This is shown in FIGS. 5A and 5B. FIG. 5A is a side (lengthwise) view of the ion decelerator 108, ion detector cell 110 and part of the ion guide 106 similar to FIG. 4A, and FIG. 5B illustrates typical DC voltages applied to the ion guide 106, ion decelerator 108 and ion detector cell 110 when trapping the ions in the ion detector cell 110. FIG. 5B also schematically illustrates the trajectory of the ions during this time. The large potential barrier at the entrance to the ion detector cell 110 is accomplished by changing the DC voltage on the decelerator 108 from 0 V to +15 V.

Significant drawbacks are associated with conventional FTMS systems such as described above and illustrated in FIGS. 1-5B. Ions traveling towards the detector cell 110 from the accumulator trap 102 begin to spread in space and time due to the differences in their masses and velocities. A further spreading of ions of the same mass will occur due to the energy variation of the ions due to the initial conditions and distribution of electric fields utilized to remove the ions from the accumulator trap 102. Because of the spread of the ions in space and time it is difficult to efficiently transport ions of a large mass range into the detector cell 110. Moreover, the reliance on the combination of ion space charge and a voltage differential between the accumulator trap 102 and the exit aperture 238 causes a variable and highly non-linear ion extraction field that further degrades the efficiency and the mass range of ions capable of being trapped in the detector cell 110. Furthermore, the electric field formed from the space charge changes as charge is removed from the accumulator trap 102. Space charge forces are a function of mass in addition to the number of charges and their spatial distribution. Furthermore, a decelerator 108 in the form of a single lens at the entrance to the detector 110 cannot produce a uniform electric field both along the axis and off the axis, but rather the field will be non-uniform, i.e. the strength (V/mm) of the field will not be constant.

In view of the foregoing, there is a need for more efficient methods and means for transporting ions from the accumulator trap into the detector cell. There is also a need for methods and apparatus that allow a larger mass range of ions to be simultaneously transported and trapped in the detector cell.

SUMMARY OF THE INVENTION

To address the foregoing problems, in whole or in part, and/or other problems that may have been observed by persons skilled in the art, the present disclosure provides methods, processes, systems, apparatus, instruments, and/or devices, as described by way of example in implementations set forth below.

According to one implementation, a method for filling an ion detector cell is provided. A plurality of ions, initially trapped in a linear-geometry ion accumulator, is transmitted from the ion accumulator to a shutter device by applying a first axial electric accelerating field across an axial length of the ion accumulator. The ions are transmitted through the shutter device and into a linear-geometry ion guide by applying a second axial electric accelerating field across an axial length of the shutter device. The ions are transmitted through the ion guide and into an ion decelerator. At least some of the ions are decelerated while being transmitted through the decelerator and into the ion detector cell by applying a first axial electric decelerating field across an axial length of the decelerator. At least some of the ions in the ion detector cell are decelerated by applying a second axial electric decelerating field across an axial length of the ion detector cell.

According to another implementation, a method for filling an ion detector cell is provided. A plurality of ions, initially trapped in a linear-geometry ion accumulator and including at least a plurality of ions of a first mass, is transmitted from the ion accumulator to a shutter device by applying a first axial electric accelerating field of a first field strength across an axial length of the ion accumulator. The ions are transmitted through the shutter device and into a linear-geometry ion guide by applying a second axial electric accelerating field of a second field strength across an axial length of the shutter device. The ions are transmitted through the ion guide and into the ion detector cell. The first field strength, the second field strength, and the axial length of the ion accumulator, the axial length of the shutter device and an axial length of the ion guide, are selected such that all of the ions of the first mass are transmitted to an exit of the ion guide at the same time.

According to another implementation, a mass spectrometer apparatus includes a linear-geometry ion accumulator arranged along an axis, a shutter device axially succeeding the ion accumulator, a linear-geometry ion guide axially succeeding the shutter device, an ion decelerator axially succeeding the ion guide, and an ion detector cell axially succeeding the ion decelerator. The ion decelerator includes a first electrode having an aperture on the axis and a second electrode having an aperture on the axis and axially spaced from the first electrode. The apparatus may further include means for applying a first axial electric accelerating field across an axial length of the ion accumulator, and means for applying a second axial electric accelerating field across an axial length of the shutter device.

According to another implementation, the mass spectrometer apparatus may further include means for applying a first axial electric decelerating field across an axial length of the decelerator, and means for applying a second axial electric decelerating field across an axial length of the ion detector cell. In yet another aspect, the mass spectrometer apparatus may further include means for switching the first decelerating field to a third accelerating field.

According to another implementation, a mass spectrometer apparatus includes a linear-geometry ion accumulator arranged along an axis, a shutter device axially succeeding the ion accumulator, a linear-geometry ion guide axially succeeding the shutter device, an ion decelerator axially succeeding the ion guide, and an ion detector cell axially succeeding the ion decelerator. The apparatus may further include means for applying a first axial electric accelerating field across an axial length of the ion accumulator, means for applying a second axial electric accelerating field across an axial length of the shutter device, means for applying a first axial electric decelerating field across an axial length of the decelerator, and means for applying a second axial electric decelerating field across an axial length of the ion detector cell. In yet another aspect, the mass spectrometer apparatus may further include means for switching the first decelerating field to a third accelerating field.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION OF THE INVENTION

As noted above, there is a need for more efficient methods and apparatus for transporting ions from the accumulator trap into the detector cell of an MS apparatus, and which also allow a larger mass range of ions to be simultaneously transported and trapped in the detector cell. In accordance with the present teachings, these goals may be obtained by applying an appropriate combination of electric fields utilized to extract ions from the accumulator trap and transport those ions into the detector cell, at appropriate locations of the MS apparatus and at appropriate times, and by selecting a proper choice of the dimensions and strengths of these electric fields. The electric fields utilized for acceleration/extraction and deceleration/retardation have a linear (axial) orientation, i.e., are formed by voltage gradients along the axis representing the general direction of ion flow from the accumulating trap to the detecting trap. These electric fields have a high degree of uniformity, i.e., their strengths (V/mm) are constant along the axis and in radial displacements from the axis. These electric fields are the predominant mechanism by which ions are extracted from the accumulating trap and collected in the detecting trap. Consequently, space-charge forces and other non-linear fields are not relied upon and the detecting trap can be filled with a maximum number of ions from a desired mass range. In certain implementations described below, a dual-stage uniform ion extraction field and/or a dual-stage uniform ion deceleration field are utilized. Dual-stage ion extraction from the accumulator may be utilized to bring all ions of the highest desirable mass to a space focus at or near the entrance of the detector cell, at the same time that most of the energy distribution of ions of the lowest desirable mass is located within the detector cell and traveling back in the direction toward the entrance of the detector cell. Dual-stage ion extraction from the accumulator may be utilized to transport ions of the same mass to a common space focus plane that may be located at an arbitrary distance from the accumulator.

Figure 1:
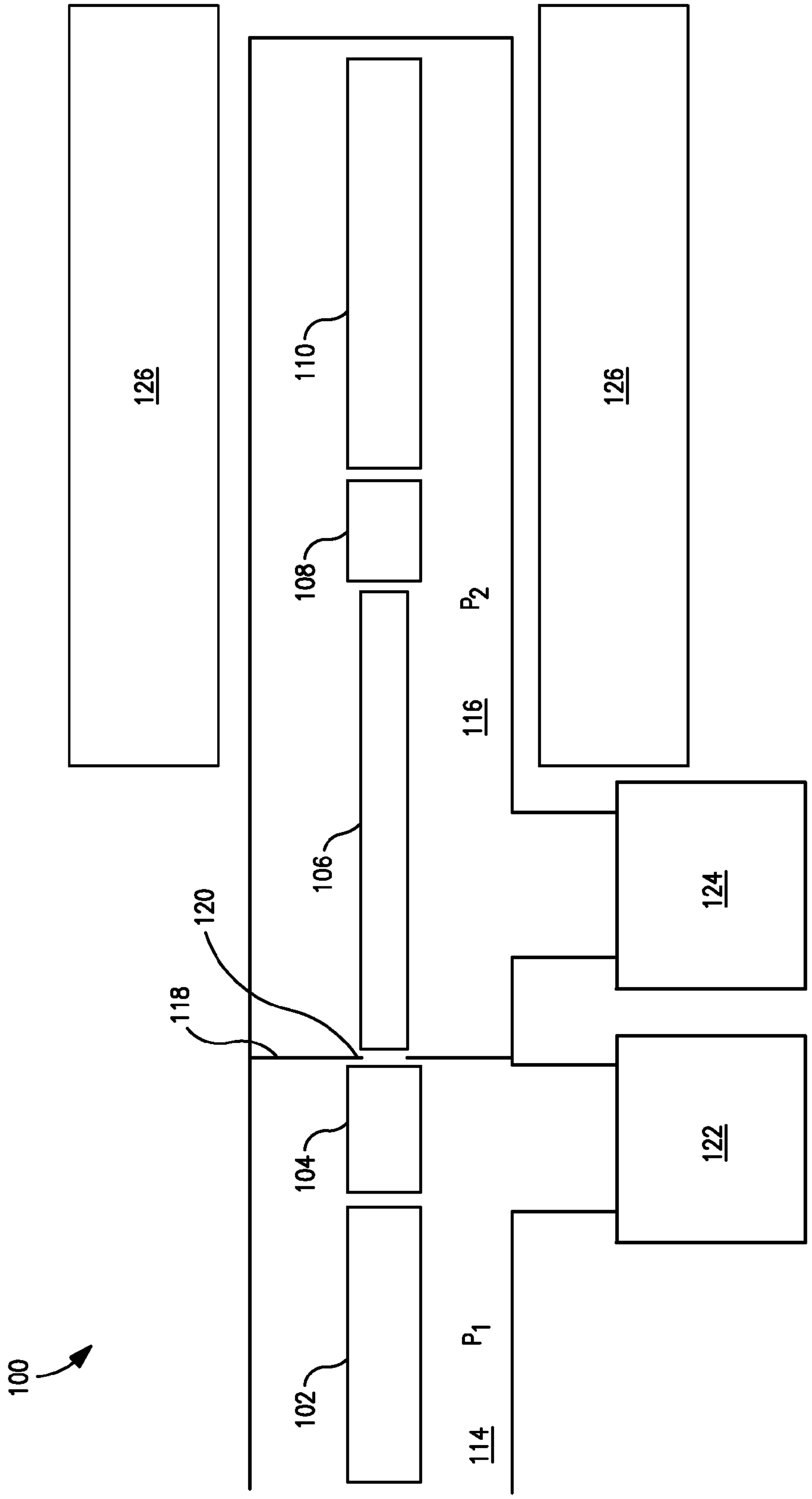
FIG. 1 (PRIOR ART)
FIG. 1 is a schematic view of a typical Fourier Transform mass spectrometer (FTMS) system.
Figure 2A:
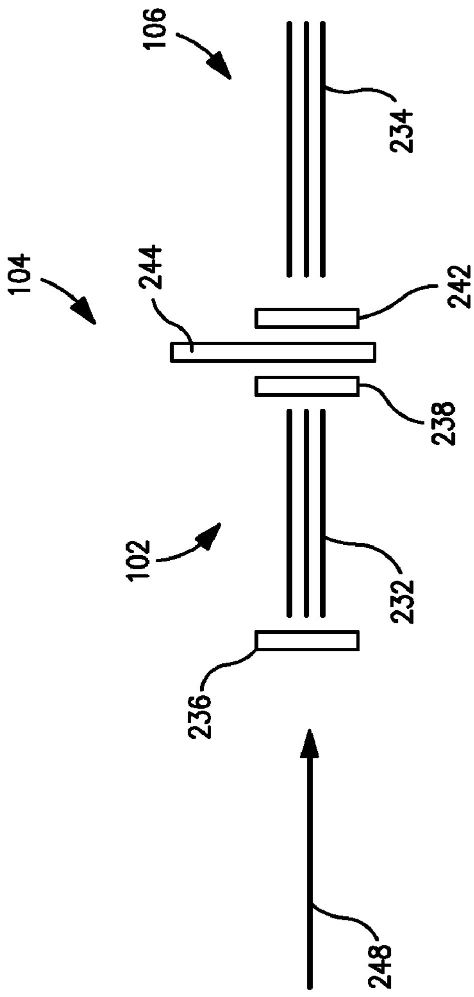
FIG. 2(A) (PRIOR ART)
FIG. 2A is a side (lengthwise) view of an ion accumulator, shutter assembly and ion guide of the FTMS system illustrated in FIG. 1.
Figure 2B:
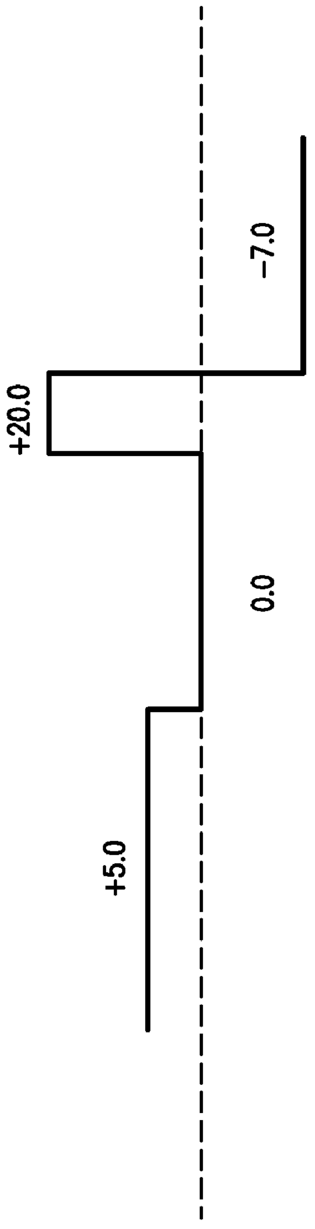
FIG. 2(B) (PRIOR ART)
FIG. 2B illustrates typical DC voltages applied to the ion accumulator, shutter assembly and ion guide of FIG. 2A when trapping ions in the ion accumulator.
Figure 3A:
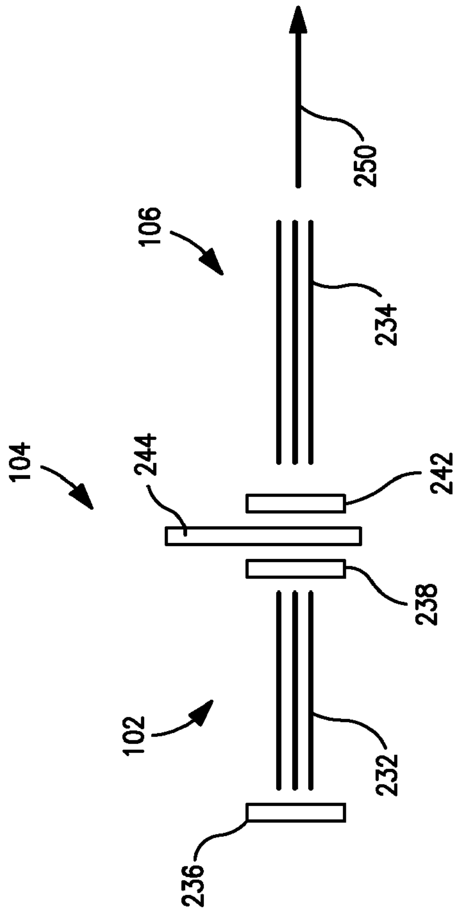
FIG. 3(A) (PRIOR ART)
FIG. 3A is a side (lengthwise) view of the ion accumulator, shutter assembly and ion guide similar to FIG. 2A.
Figure 3B:
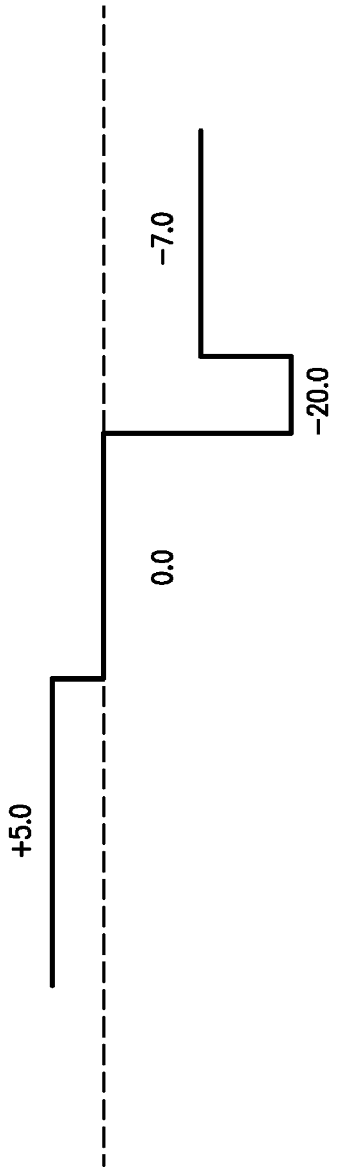
FIG. 3(B) (PRIOR ART)
FIG. 3B illustrates typical DC voltages applied to the ion accumulator, shutter assembly and ion guide of FIG. 3A when extracting the trapped ions from the ion accumulator.
Figure 4A:
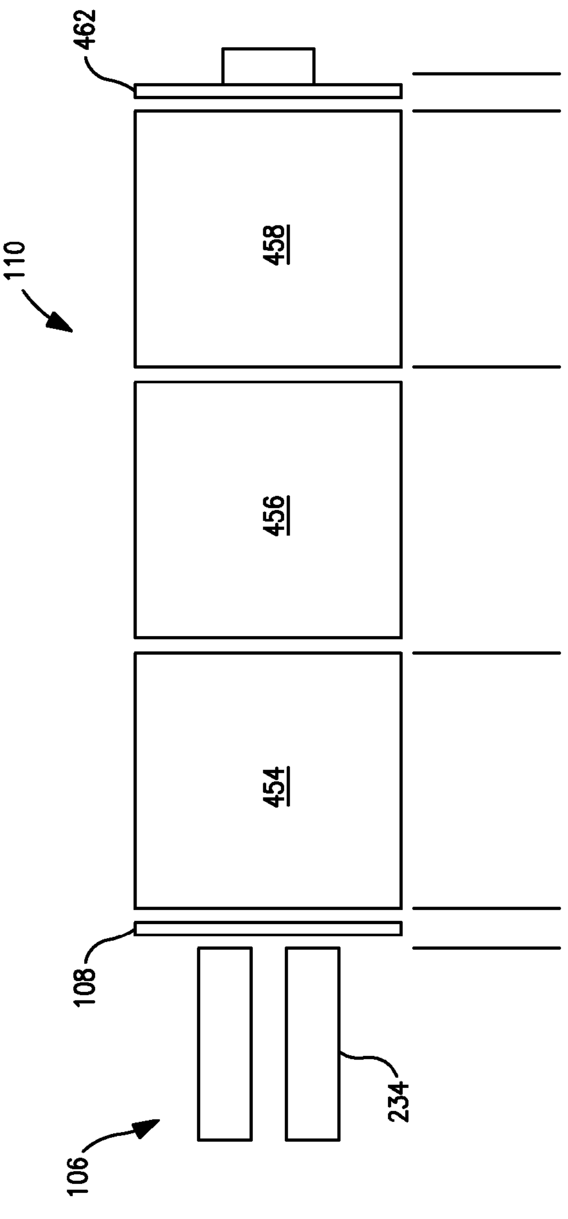
FIG. 4(A) (PRIOR ART)
FIG. 4A is a side (lengthwise) view of the ion decelerator and ion detector cell illustrated in FIG. 1, as well as part of the ion guide preceding the ion detector cell.
Figure 4B:
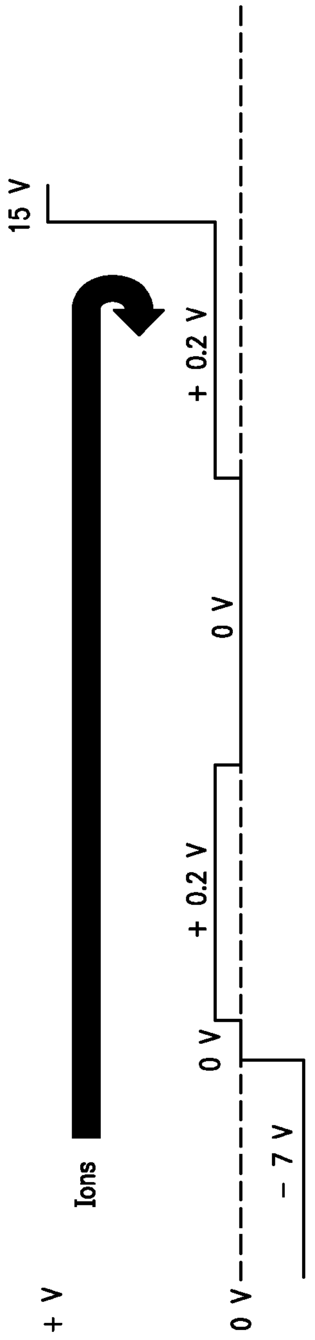
FIG. 4(B) (PRIOR ART)
FIG. 4B illustrates typical DC voltages applied to the ion guide, ion decelerator and ion detector cell of FIG. 4A when admitting ions in the ion detector cell.
Figures 5A, 5B:
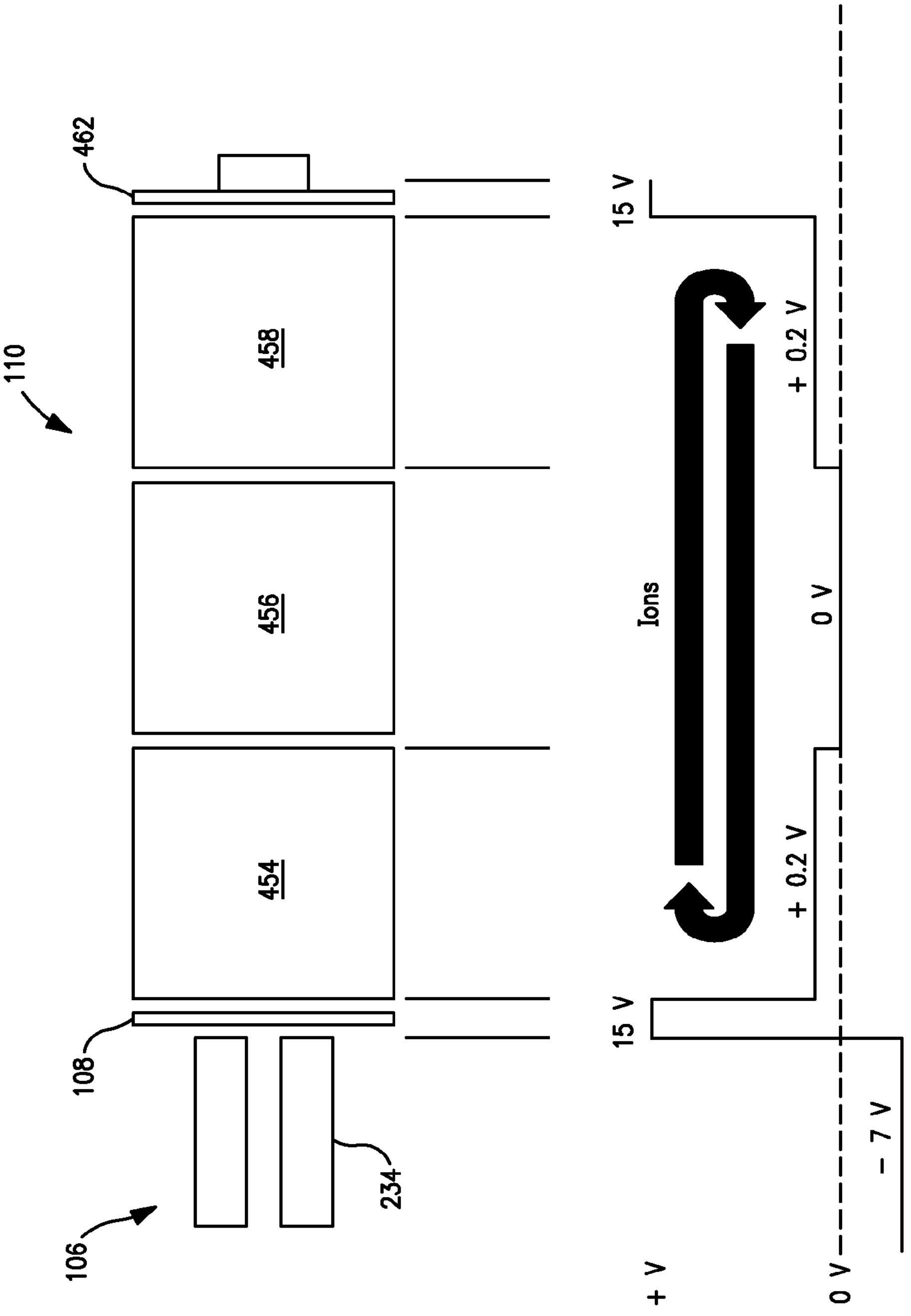
FIG. 5(A) (PRIOR ART)
FIG. 5(B) (PRIOR ART)
FIG. 5A is a side (lengthwise) view of the ion decelerator, ion detector cell and part of the ion guide similar to FIG. 4A.
FIG. 5B illustrates typical DC voltages applied to the ion guide, ion decelerator and ion detector cell guide when trapping the ions in the ion detector cell.
Figure 6A:
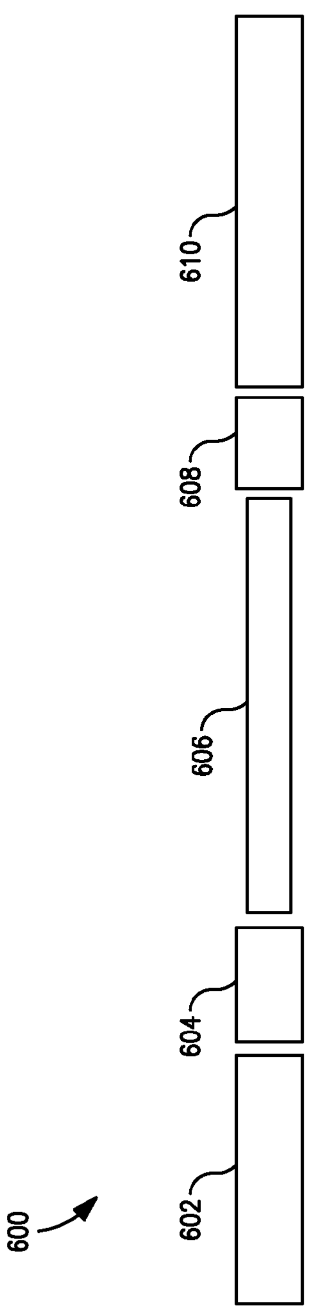
FIG. 6A is a schematic view of an example of a mass spectrometer (MS) apparatus according to certain implementations of the present disclosure.

FIG. 6A is a schematic view of an example of a mass spectrometer (MS) apparatus 600 according to certain implementations of the present disclosure. The MS apparatus 600 generally includes an ion source (not shown) followed by an ion accumulator 602, a shutter assembly 604, an ion guide 606, an ion decelerator 608, and an ion detector cell 610 arranged in series about a central longitudinal axis. The enclosed vacuum regions, associated pumps, magnet assembly and other known components of the MS apparatus 600 are not shown for simplicity. The accumulator 602, ion guide 606, and detector cell 610 may be structured as described above in conjunction with FIGS. 1-5. For example, the accumulator 602 and the ion guide 606 may be configured as linear (2D) multipole electrode sets with axial end electrodes for entrances and exits, and the detector cell 610 may include transmitter/detector plates between trapping rings and axial end electrodes. Generally, any suitable design may be selected for the ion source preceding the accumulator 602, particularly an atmospheric-pressure (AP) type source. Continuous-beam sources particularly benefit from implementation of the present teachings, such as for example an electrospray ionization (ESI) source or an AP chemical ionization (APCI) source, although other ionizing devices such an AP photo-ionization source (APPI) or a matrix-assisted laser desorption ionization (MALDI) source may also be utilized.

Figure 6B:
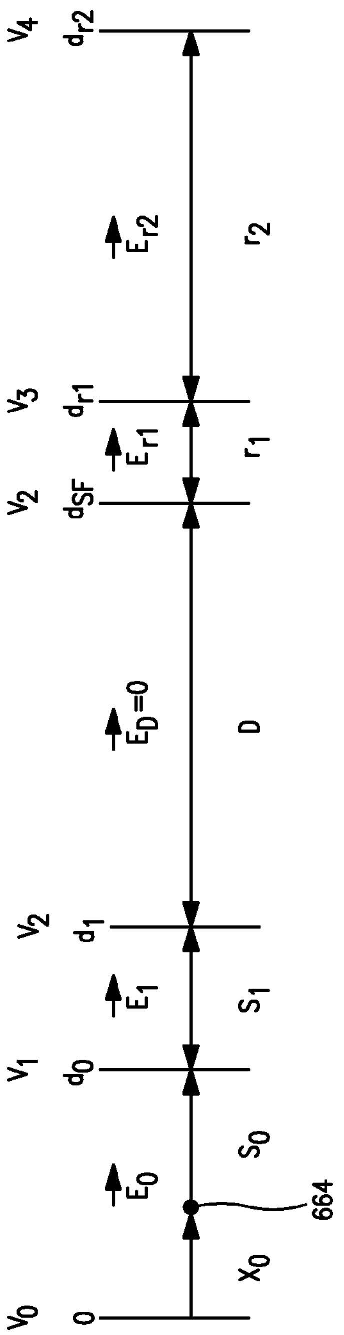
FIG. 6B is a diagram illustrating the relative lengths and axial positions of components of the MS apparatus of FIG. 6A, and respective DC voltages and linear axial electric fields applied to these components.

FIG. 6B is a diagram illustrating the relative lengths and axial positions of the accumulator 602, shutter assembly 604, ion guide 606, decelerator 608 and detector cell 610, and respective DC voltages and linear axial electric fields applied to these components. In FIG. 6B, point 0, point $d_0$, point $d_1$, point $d_{SF}$, point $d_{r1}$ and point $d_{r2}$ are axial positions along the axis. Point 0 demarcates the entrance of the accumulator 602, point $d_0$ demarcates the exit of the accumulator 602 and entrance of the shutter assembly 604, point $d_1$ demarcates the exit of the shutter assembly 604 and entrance of the ion guide 606, point $d_{SF}$ demarcates the exit of the ion guide 606 and entrance of the decelerator 608, point $d_{r1}$ demarcates the exit of the decelerator 608 and entrance of the detector cell 610, and point $d_{r2}$ demarcates the distal end of the detector cell 610. DC voltages are applied by suitable voltage sources (not shown) communicating with these components as follows: a voltage of $V_0$ is applied at point 0, a voltage of $V_1$ is applied at point $d_0$, a voltage of $V_2$ is applied at point $d_1$ and point $d_{SF}$, a voltage of $V_3$ is applied at point $d_{r1}$ and a voltage of $V_4$ is applied at point $d_{r2}$. FIG. 6B also depicts a packet of ions 664 trapped in the transverse plane by the RF field applied by the accumulator 602 located at an arbitrary point $X_0$ along the axis. $S_0$ is the distance along the axis of the ions 664 at point $X_0$ to the exit of the accumulator 602. The accumulator 602 has an axial length of $d_0$ ($d_0-0$). The shutter assembly 604 has an axial length of $S_1$, or $d_1-d_0$. The ion guide 606 has an axial length of D, or $d_{SF}-d_1$. The decelerator 608 has an axial length of r1, or $d_{r1}-d_{SF}$. The detector cell 610 has an axial length of r2, or $d_{r2}-d_{r1}$. Linear axial DC electric fields $E_0$, $E_1$, $E_D$, $E_{r1}$ and $E_{r2}$ are applied across the respective axial lengths of the accumulator 602, shutter assembly 604, ion guide 606, decelerator 608 and detector cell 610. In typical implementations of the present teachings, the ion guide 606 is maintained in an axial electric field-free condition ($E_D=0$).

Ions are extracted from the accumulator 602 and transported into the detector cell 610 as follows. After the ions have been trapped in the accumulator 602 for a desired time, potential differences are respectively applied to generate the electric fields $E_0$, $E_1$, $E_{r1}$ and $E_{r2}$. The electric fields $E_0$ and $E_1$ are extraction or accelerating fields and the electric fields $E_{r1}$ and $E_{r2}$ are decelerating or retarding fields. Thus, the ions are transported by the electric field $E_0$ from the accumulator 602 into the shutter assembly 604. In the shutter assembly 604 the ions are subjected to the second electric field $E_1$ and accelerated thereby to a final velocity. The electric field $E_1$ transports the ions into the axial field-free ion guide 606. The ions traverse the ion guide 606 and enter the decelerator 608 where they may be decelerated in the retarding electric field $E_{r1}$ (which, in some implementations, may depend on the mass of the ions and timing, as described below). The ions then enter the detector cell 610 where they may be further decelerated in the second retarding electric field $E_{r2}$ before being subsequently trapped in the detector cell 610 for mass analysis.

Figure 7A:
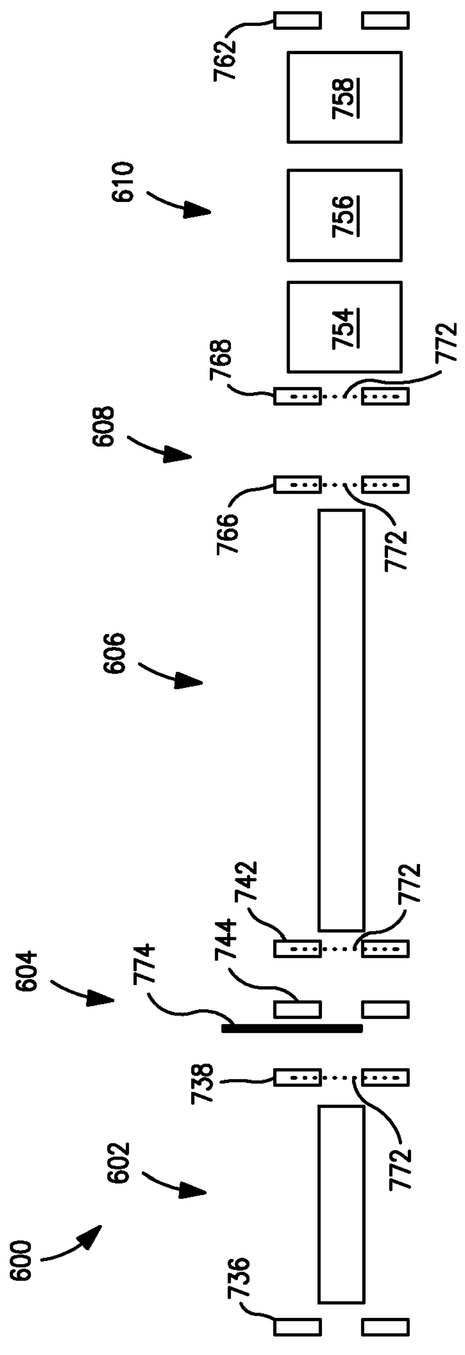
FIG. 7A is a more detailed schematic view of the MS apparatus illustrated in FIG. 6A.
Figure 7B:
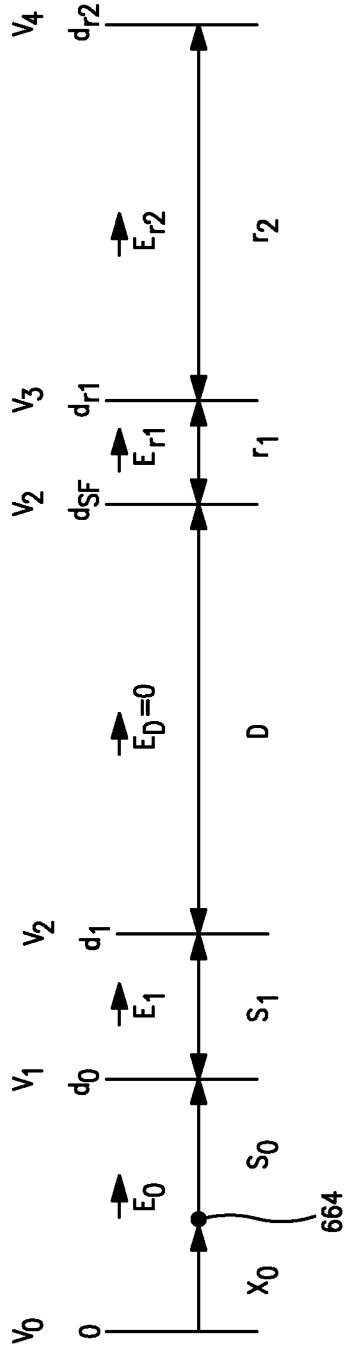
FIG. 7B is a diagram illustrating the relative lengths and axial positions of components of the MS apparatus of FIG. 7A, and respective DC voltages and linear axial electric fields applied to these components, similar to FIG. 6B.

FIG. 7A is a more detailed schematic view of the MS apparatus 600 illustrated in FIG. 6A, and FIG. 7B is a diagram similar to FIG. 6B corresponding to this example. The accumulator 602 includes an ion entrance electrode 736 and an ion exit electrode 738 positioned at the opposing axial ends of the accumulator 602. The ion guide 606 includes an ion entrance electrode 742 and an ion exit electrode 766, and the detector cell 610 includes an ion entrance electrode 768 and an ion exit electrode 762. As appreciated by persons skilled in the art, the axial electrodes 736, 738, 744, 742, 766, 768, 762 may be configured, for example, as lenses, i.e. plates or cylinders with apertures centered on the axis. The detector cell 610 may be configured as described above, i.e., include transmitter/detector electrodes 756 axially interposed between inner trapping electrodes 754, 758. Depending on design, the axial electrode 762 at the distal end of the detector cell 610 may or may not be utilized as an ion exit and thus may or may not include an aperture. Mesh grids 772 may be added to some or all of the apertures to provide more uniform electric fields for ion extraction and deceleration. That is, the grids 772 help to make the strengths of the electric fields more constant along the axis as well as in radial directions from the axis. The shutter assembly 604 includes a central apertured electrode 744 between the ion exit electrode 738 of the accumulator 602 and the ion entrance electrode 742 of the ion guide 606. The ion exit electrode 738 of the accumulator 602 may be considered as being the ion entrance into the shutter assembly 604 and the ion entrance electrode 742 of the ion guide 606 may be considered as being the ion exit from the shutter assembly 604. As a physical component, the shutter assembly 604 may be considered as including the ion exit electrode 738 of the accumulator 602 and the ion entrance electrode 742 of the ion guide 606, or as sharing these electrodes 738, 742 with the accumulator 602 and the ion guide 606. The shutter assembly 604 may also include a movable shutter element 774 as described earlier in this disclosure. The ion exit electrode 766 of the ion guide 606 may be considered as being the ion entrance into the decelerator 608 and the ion entrance electrode 768 of the detector cell 610 may be considered as being the ion exit from the decelerator 608. The decelerator 608 may be considered as including the ion exit electrode 766 of the ion guide 606 and the ion entrance electrode 768 of the detector cell 610, or as sharing these electrodes 766, 768 with the ion guide 606 and the detector cell 610. In this example, point 0 corresponds to the axial position of the ion entrance electrode 736 of the accumulator 602, point $d_0$ corresponds to the axial position of the ion exit electrode 738 of the accumulator 602, point $d_1$ corresponds to the axial position of the ion entrance electrode 742 of the ion guide 606, point $d_{SF}$ corresponds to the axial position of the ion exit electrode 766 of the ion guide 606, point $d_{r1}$ corresponds to the axial position of the ion entrance electrode 768 of the detector cell 610, and point $d_{r2}$ corresponds to the axial position of the ion exit electrode 762 of the detector cell 610. The axial lengths of the accumulator 602, shutter assembly 604, ion guide 606, decelerator 608 and detector cell 610 may be defined by these axial points as described above.

It will be appreciated by persons skilled in the art that implicit in the schematic illustrations of FIGS. 6A and 7A are the various RF and DC voltage sources in signal communication with the various electrodes as required to produce the electric fields being utilized. Also implicitly shown is a controller, i.e., one or more typically electronic processor-based control devices communicating with the various components as needed for controlling the application, timing and adjustment of the various RF and DC voltages, for coordinating the trapping and detecting operations of the detector cell 610 with other components of the MS apparatus 600, etc.

Figure 8A:
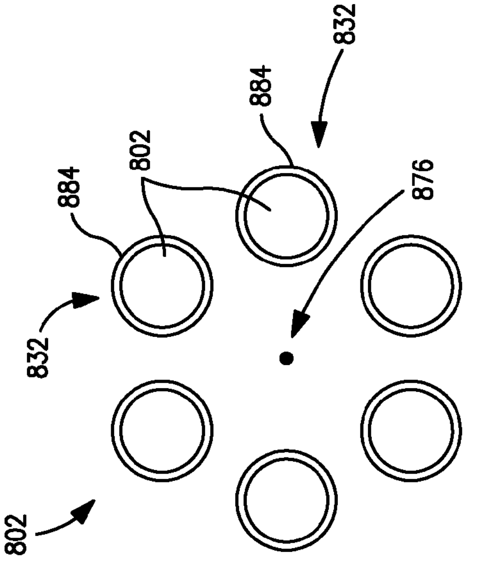
FIG. 8A is a cross-sectional view of one example of an ion accumulator, in the transverse plane perpendicular to a central axis of the ion accumulator, which may be included in the MS apparatus of FIG. 6A or 7A according to the present disclosure.
Figure 8B:
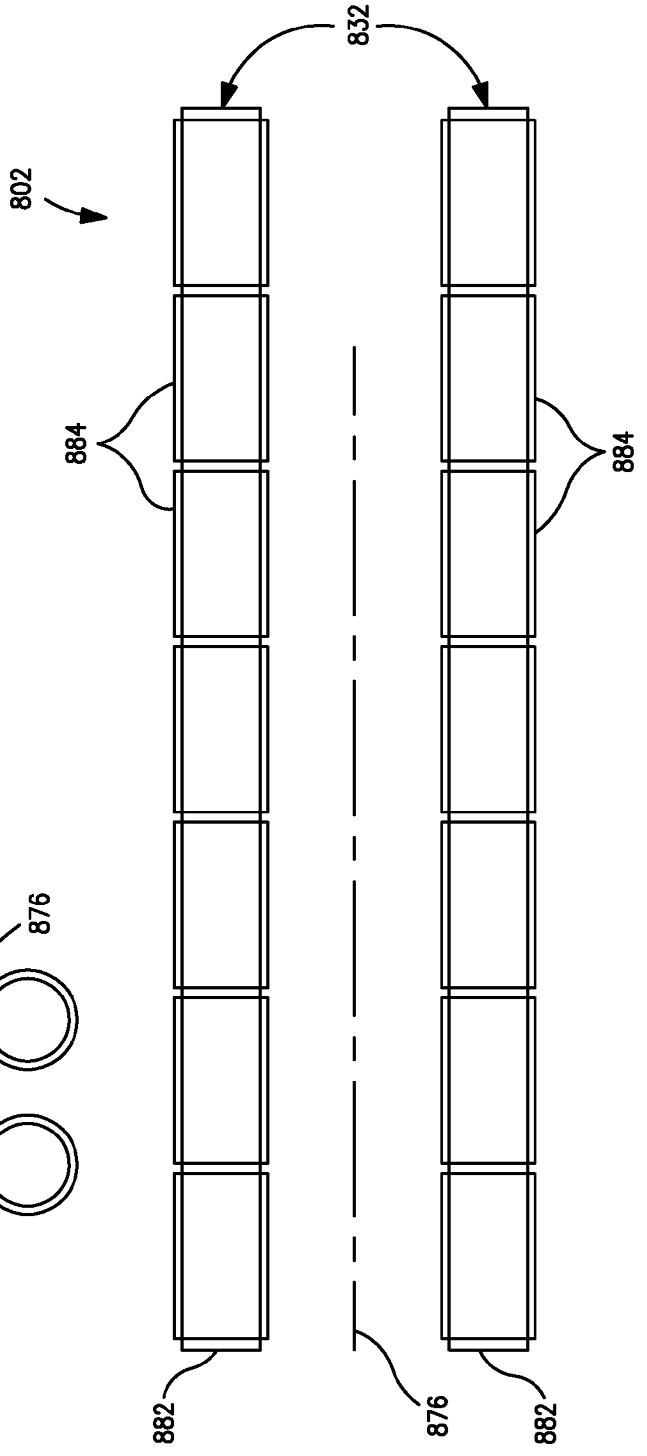
FIG. 8B is a side (lengthwise) view of the ion accumulator illustrated in FIG. 8A.

FIG. 8A is a cross-sectional view of another example of an ion accumulator 802, in the transverse plane perpendicular to a central axis 876, according to the present disclosure. FIG. 8B is a side (lengthwise) view of the ion accumulator 802 according to this example. The accumulator 802 includes a plurality of electrodes 832 extending between a first axial end 836 and an opposing second axial end 838. For clarity, only two electrodes 832 are shown in FIG. 8B. The accumulator 802 typically includes six electrodes 832 (a hexapole arrangement) coaxially arranged about the central axis 876 at a radial distance therefrom. For purposes of the present disclosure, the term "radial" indicates a direction orthogonal to the central axis 876. The electrodes 832 are circumferentially spaced from each other in a transverse plane orthogonal to the central axis 876. The number of electrodes 832 may alternatively be eight (octopole) or more, or four (quadrupole). The accumulator 802 may generally include a housing or frame (not shown) or any other structure suitable for supporting the electrodes 832 in a fixed arrangement relative to the central axis 876, and for providing an evacuated, low-pressure environment suitable for trapping ions using radio frequency (RF) energy as described earlier. The electrodes 832 circumscribe an interior space (ion trapping region) that likewise extends along the central axis 876 from the first axial end 836 to the second axial end 838. By applying an appropriate RF (or RF/DC) voltage signal to the electrodes 832, the electrodes 832 generate a linear (2D) ion trapping field along the length of the accumulator 802 that constrains ions of a certain m/z range to radial motions focused along the central axis 876, whereby the ions occupy an axially elongated region cloud within the interior space. The RF voltage signal typically has a sinusoidal waveform although other periodic waveforms may be utilized as appreciated by persons skilled in the art. In a typical implementation the RF voltage signal applied to any given electrode 832 is 180 degrees out-of-phase with the RF voltage signal applied to the circumferentially adjacent electrodes 832; that is, alternating electrodes 832 are driven out-of-phase with each other. The ion cloud may be further compressed by damping the motions of the ions through collisions with an inert collision gas, which may be introduced into the interior space from a gas source (not shown) by any suitable means. The ion guide 606 (FIG. 7A) may also be configured as a linear multipole electrode set in the manner just described for the accumulator 802.

It will be understood that a multipole arrangement formed by a set of electrodes parallel to the axis is just one example of how to configure the accumulator 802 or the ion guide 606. Another example is a series of rings axially spaced from each and coaxially surrounding the axis. Another example is a set of helical electrodes coiled about the axis and running along the axis from the entrance end to the exit end. More generally, the accumulator 802 or the ion guide 606 may be configured to have any suitable linear geometry relative to the axis that is capable of applying a 2D RF trapping field and an appropriate axial DC field as described herein.

FIGS. 8A and 8B also illustrate one way in which the accumulator 802 may be configured for applying a uniform axial DC field $E_0$ in accordance with the present disclosure, as an alternative to simply applying voltages $V_0$ and $V_1$ to the ion entrance electrode and ion exit electrode, respectively. In FIGS. 8A and 8B, each electrode 832 is configured so as to contain a series of axially spaced electrically conductive segments that are electrically isolated from each other. In the illustrated example, each ion guide electrode 832 is formed from insulating rods 882 that are coated with axially spaced conductive (e.g., metal) bands 884. DC voltage sources (not shown) may be placed in signal communication with each band 884 whereby the DC voltage on each individual band 884 is independently adjustable, while a common RF trapping voltage is applied to each band 884. This configuration enables the generation of an axial DC field $E_0$ with a highly controllable axial DC voltage gradient over the length of the accumulator 802.

Another alternative to the example shown in FIGS. 8A and 8B is to divide the accumulator electrodes 832 into physically distinct axial segments separated by gaps, with each segment in signal communication with a DC voltage source, so long as inhomogeneous fields in the regions of the gaps do not interfere with the uniform axial DC field $E_0$ utilized to extract ions in accordance with the present teachings. A similar alternative is to divide two or more helical electrodes into axial segments and apply DC voltages to each segment. Another alternative is to provide the accumulator electrodes 832 as a series of rings and apply respective DC voltages to each ring. In all these cases, the accumulator electrodes 832 may be considered as including a series of axially spaced electrically conductive segments (axial segments, helical segments, rings, etc.).

Figure 9:
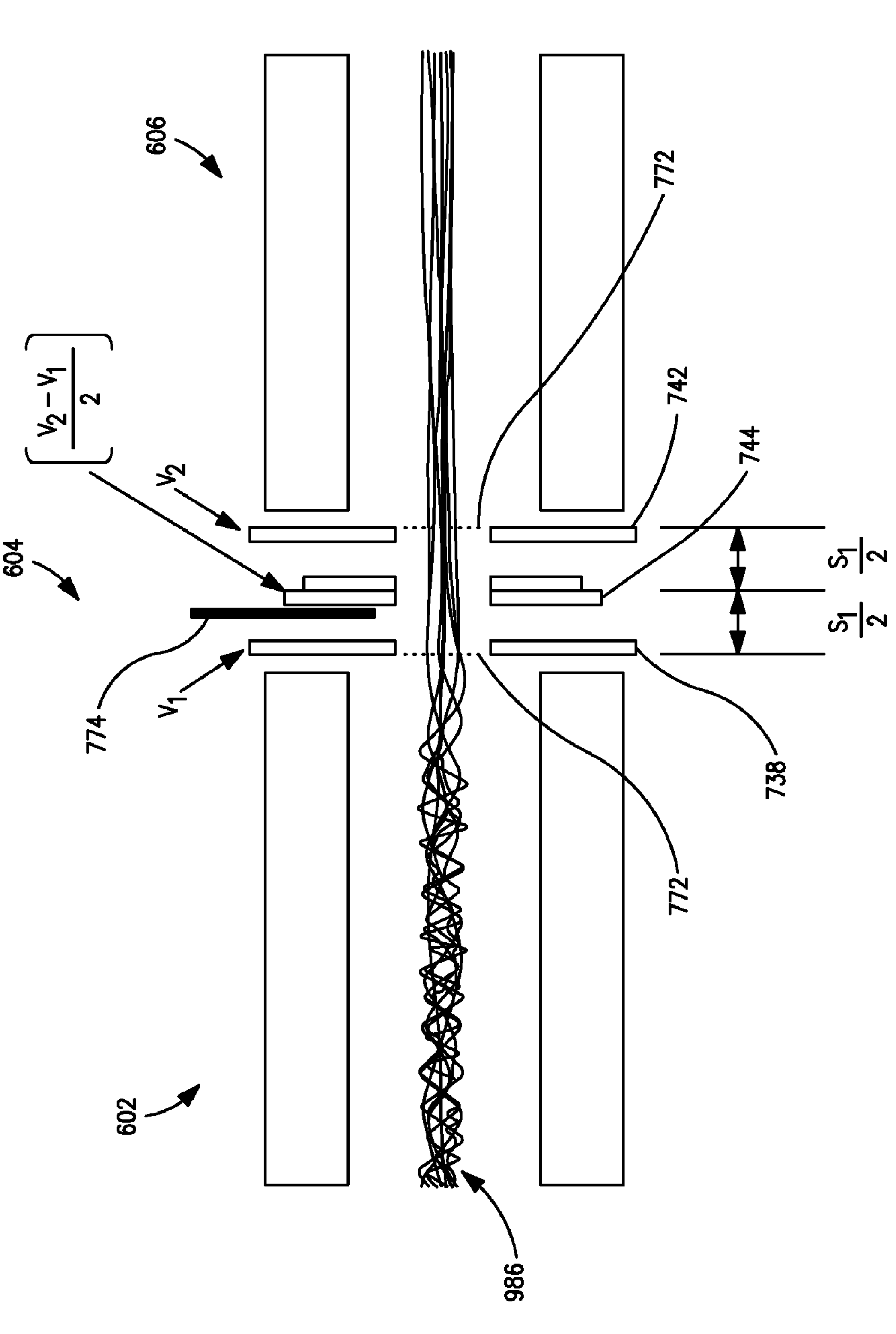
FIG. 9 is a side (lengthwise) view of a shutter assembly and adjacent regions of an ion accumulator and ion guide of the MS apparatus illustrated in FIG. 7A, and additionally showing the trajectories of ions.

FIG. 9 is a side (lengthwise) view of the shutter assembly 604 and adjacent regions of the ion accumulator 602 and ion guide 606, and additionally showing the trajectories of ions 986 as calculated by the commercially available SIMION® finite element ion simulation program (Scientific Instrument Services, Inc., Ringoes, N.J.) during ion extraction from the accumulator 602. The accumulator 602 and the ion guide 600 had hexapole electrode configurations. The accelerating field $E_1$ over the length of the shutter assembly 604 was established by the voltage $V_1$ applied to the axial electrode 738 between the accumulator 602 and the shutter assembly 604 and the voltage $V_2$ applied to the axial electrode 742 between the shutter assembly 604 and the ion guide 606. The apertures of the axial electrodes 738, 742 were covered with electrical grids 772 to improve the uniformity of the electric field $E_1$ between them. The central electrode 744 of the shutter assembly 604 was located at the axial midpoint of the shutter assembly ($S_1/2$), whereby the central electrode 744 had a DC voltage of $(V_2-V_1)/2$. As described above, after trapping and gas damping by collisions, the ions 986 are transported through the accumulator 602 under the influence of its electric field $E_0$ and are accelerated in the field $E_1$ of the shutter assembly 604, whereby the ions 986 enter the ion guide 606 and travel toward the detector cell 610 (FIG. 7A). The gas pressure in the accumulator 602 may be increased for a short period of time to facilitate ion trapping and the reduction of kinetic energy spread by means of ion-gas molecule collisions.

Figure 10A:
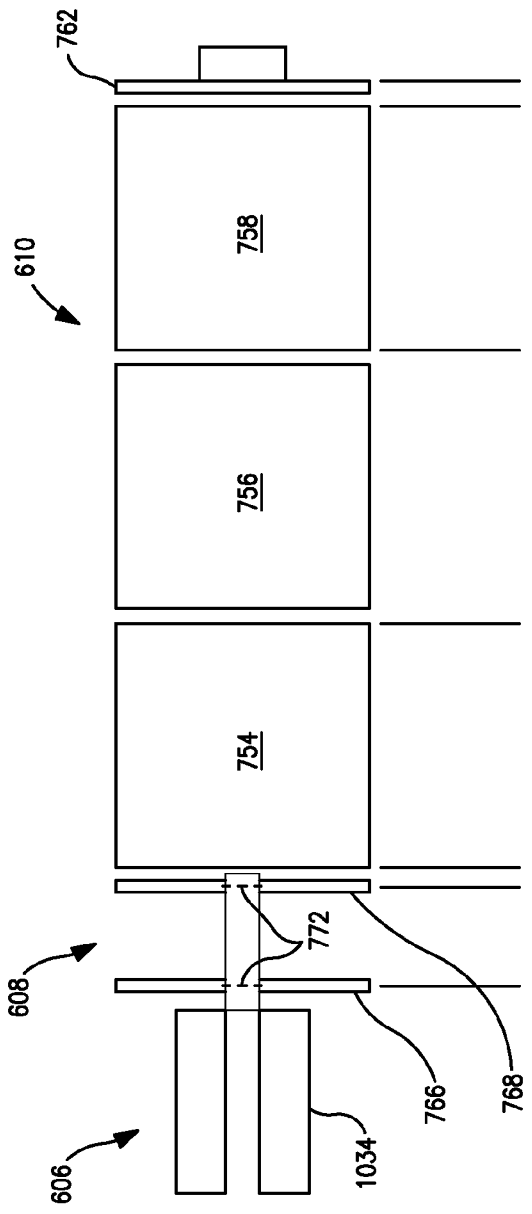
FIG. 10A is a side (lengthwise) view of the decelerator and detector cell of FIG. 7A, and the portion of the ion guide preceding the decelerator.
Figure 10B:
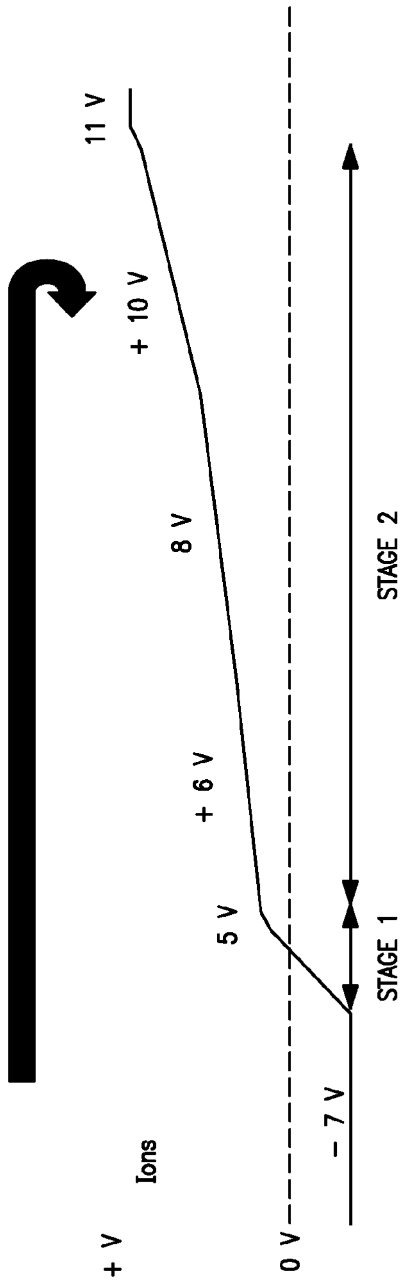
FIG. 10B illustrates an example of DC voltages that may be applied to electrodes of the ion guide, decelerator and detector cell of FIG. 10A when admitting ions into the detector cell from the accumulator, and also schematically illustrates the trajectory of the ions during this time.

FIG. 10A is a side (lengthwise) view of the decelerator 608, the detector cell 610, and the portion of the ion guide 606 preceding the decelerator 608. FIG. 10B illustrates an example of the DC voltages that may be applied to the electrodes of the ion guide 606, decelerator 608 and detector cell 610 when admitting ions into the detector cell 610 from the accumulator 602, and also schematically illustrates the trajectory of the ions during this time. In this example, a DC voltage of −7 V is applied to the trapping electrodes 1034 and ion exit electrode 766 of the ion guide 606, a DC voltage of +5 V is applied to the ion entrance electrode 768 of the detector cell 610, a DC voltage of +6 V is applied to the first trapping electrode 754 of the detector cell 610, a DC voltage of +8 V is applied to the central electrode(s) 756 of the detector cell 610, a DC voltage of +10 V is applied to the second trapping electrode 758 of the detector cell 610, and a DC voltage of +11 V is applied to the ion exit electrode 762 of the detector cell 610. More generally, the voltages are arranged to form a two-stage uniform electric deceleration field, with the first deceleration field ($E_{r1}$) applied over the length of the decelerator 608 and the second deceleration field ($E_{r2}$) applied over the length of the detector cell 610.

Also in accordance with the present teachings, the geometry of the MS apparatus 600 (in particular the respective axial lengths of the accumulator 602, the shutter assembly 604 and the ion guide 606), and in turn the two-stage acceleration field applied to the accumulator 602 and shutter assembly 604, may be selected such that all (or substantially all) ions of the same mass (m/z ratio) initially stored in the accumulator 602 are transmitted into the detector cell 610 at the same time in response to activation of these acceleration fields, regardless of the initial axial position $X_0$ of the ions in the accumulator 602 at the time of activation of the acceleration fields. Additionally, in cases where ions of differing masses are initially stored in the accumulator 602, the additional selection of the respective axial lengths of the decelerator 608 and the detector cell 610 and the two-stage decelerating field applied thereto may ensure that the detector cell 610 is filled with the broadest mass range of ions desired to be analyzed, and the greatest number of such ions, during a very short filling time.

Figure 11A:
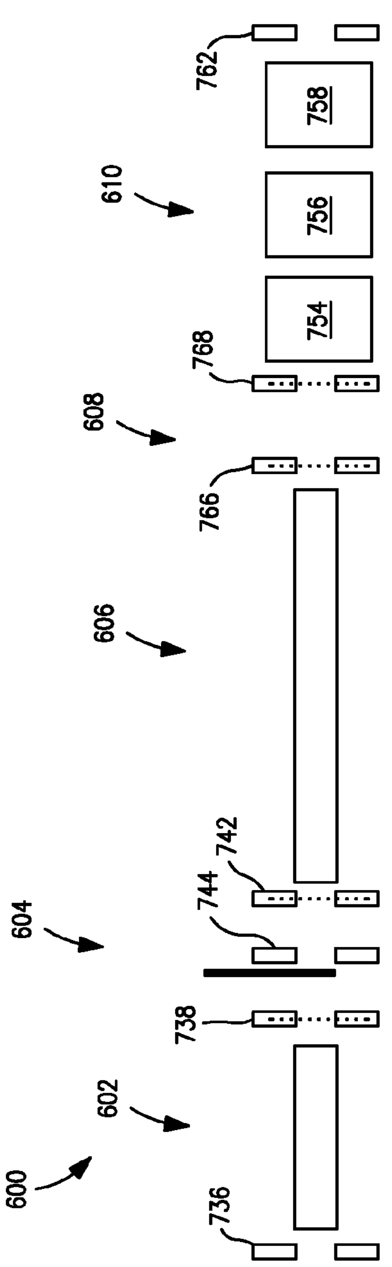
FIG. 11A is a schematic view of an MS apparatus similar to FIG. 7A.
Figure 11B:
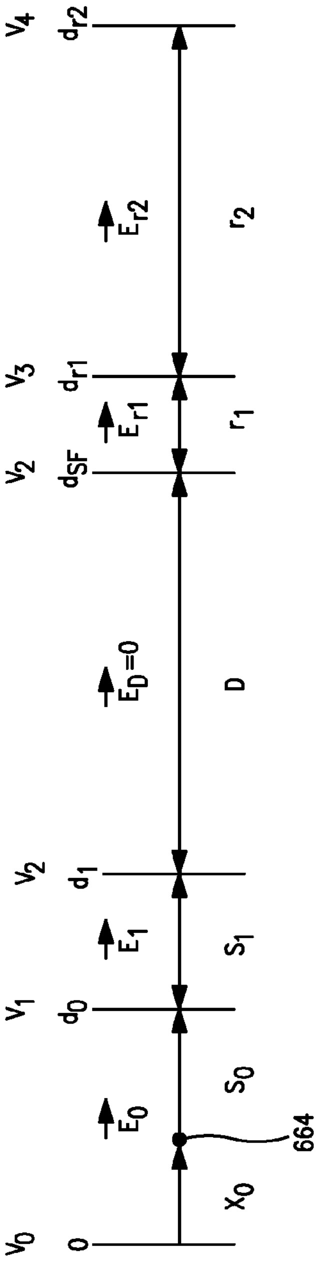
FIG. 11B is a diagram illustrating the relative lengths and axial positions of an accumulator, shutter assembly, ion guide, decelerator and detector cell of the MS apparatus of FIG. 11A, and respective DC voltages and linear axial electric fields applied to these components, similar to FIG. 7B.
Figure 11C:
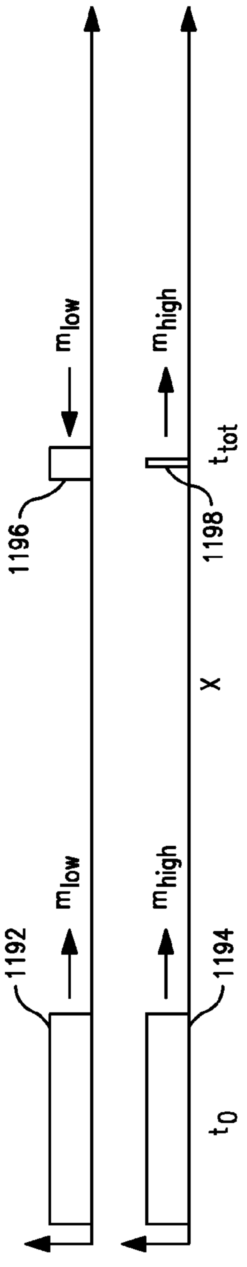
FIG. 11C is a diagram illustrating the axial positions at different times of two packets of ions of low mass and high mass processed by the MS apparatus of FIG. 11A.

FIG. 11 illustrates an example of how to optimize filling the detector cell 610 with ions. Specifically, FIG. 11A is a schematic view of an MS apparatus 600 similar to FIG. 7A. FIG. 11B is a diagram illustrating the relative lengths and axial positions of the accumulator 602, shutter assembly 604, ion guide 606, decelerator 608 and detector cell 610, and respective DC voltages and linear axial electric fields applied to these components, similar to FIG. 7B. FIG. 11C is a diagram illustrating the axial positions at different times of two packets of ions of low mass ($m_{low}$) and high mass ($m_{high}$). For purposes of the present example, the low mass ions ($m_{low}$) may be considered as being the ions having the lowest mass desired to be analyzed in the detector cell 610, and the high mass ions ($m_{high}$) may be considered as being the ions having the highest mass desired to be analyzed in the detector cell 610. Therefore, it is desired that the detector cell 610 be efficiently filled with ions falling within a mass range from $m_{low}$ to $m_{high}$. This range may include ions of mass $m_{low}$, ions of mass $m_{high}$, and any ions with masses falling between these two values, all of which were initially stored in the accumulator 602 prior to extraction. As shown in FIG. 11C, after the ions are injected into the accumulator 602 and trapped thereby they are initially distributed along the length of the accumulator trap 602, $d_0$, as indicated by ion packets 1192 and 1194. Thus, at this time a given ion's initial axial position $X_0$ in the accumulator 602 and consequently its initial axial distance $S_0$ from the exit of the accumulator 602 may be different than other ions of the same mass as well as ions of different masses. The ions travel towards the detector cell 610 when the extraction field, $E_0$, is turned on at time t=0. After a time $t_{tot}$ the high mass ions have traveled to the point $d_{SF}$ and the low mass ions have passed the point $d_{SF}$, have been reflected by the potential $V_4$ and are moving back in the direction of the accumulator trap 602, as indicated by ion packets 1196 and 1198. At this time the potentials are readjusted such as, for example, shown in FIG. 5 to fill and trap the ions in the range $m_{low}$ to $m_{high}$ in the detector cell 610.

As stated earlier, initially there is no axial electric field ($E_0$=0) applied to the accumulator 602. Thus, the ions are at rest, due to cooling of their kinetic energy by collisions, and are distributed along the axis of the accumulator 602. At time t=0 the electric field is changed to a value of $E_0$. Ions located at point $X_0$ will move to the end of the accumulator 602. The time $t_0$ required for ions initially located at point $X_0$ to traverse the length $S_0$ (move to the end of the accumulator 602) upon application of the extraction field $E_0$ may be calculated as follows.

Time $t_0$ in $E_0$

Generally, the change in kinetic energy (KE) experienced by an ion traveling in a linear direction from a point 0 to a point x is:

$$\Delta KE = (1/2)mv_x^2 = \int_0^x eE_0 dx = eE_0 x, \tag{1}$$

where m is the mass of the ion and e is the electronic charge of the ion. Thus, the velocity of the ion at point x, $v_x$, is:

$$v_x = \left(\frac{2eE_0x}{m}\right)^{1/2} = \frac{dx}{dt} \tag{2}$$

Applying these equations to the accumulator 602 shown in FIG. 11A yields expressions for the velocity at point $d_0$ and the time $t_0$ required to reach $d_0$:

$$t_0 = \int_0^{S_0}\left(\frac{2eE_0x}{m}\right)^{-1/2} dx = \left(\frac{2m}{eE_0}\right)^{1/2} S_0^{1/2} \tag{3}$$

$$v_{d0} = \left(\frac{2e}{m}\right)^{1/2}(E_0S_0)^{1/2} \tag{4}$$

Time $t_1$ in $E_1$

By analogy to equations 1-4, the velocity at point $d_1$, $v_{d1}$, and the time $t_1$ required to reach $d_1$ are:

$$v_{d1} = v_D = \left(\frac{2}{m}\right)\left(\frac{mv_{d1}^2}{2} + eE_1S_1\right)^{1/2} = \left(\frac{2e}{m}\right)^{1/2}(E_0S_0 + E_1S_1)^{1/2} \tag{5}$$

$$t_1 = \left(\frac{m}{2e}\right)^{1/2}\left[\frac{2S_1}{(E_0S_0 + E_1S_1)^{1/2} + (E_0S_0)^{1/2}}\right] \tag{6}$$

As shown above, the velocity at point $d_1$, $v_{d1}$, is approximated to be equal to the velocity at point $d_{SF}$, $v_D$ (disregarding any momentum losses), as no new axial electric field is applied in the ion guide 606 ($E_D$=0) in the present example.

Time $t_D$ to travel distance D to point $d_{SF}$ $$t_D = \frac{D}{v_{d1}} = \left(\frac{m}{2e}\right)^{1/2}\left[\frac{D}{(E_0S_0 + E_1S_1)^{1/2}}\right] \tag{7}$$

Time $t_{tot}$ to travel distance $S_0$+$S_1$+D from point $X_0$ to point $d_{SF}$ $$t_{tot} = t_0 + t_1 + t_D \tag{8}$$

From equation 3, the time $\Delta t_0$ required for an ion to travel through a small displacement of $S_0$, or $\Delta S_0$, is:

$$\Delta t_0 = t_0(S_0) - t_0(S_0 + \Delta S_0) = \left(\frac{2m}{eE_0}\right)^{1/2}(S_0^{1/2} - (S_0 + \Delta S_0)^{1/2}) \tag{9}$$

Expanding:

$$(S_0 + \Delta S_0)^{1/2} \sim S^{1/2} + \frac{\Delta S_0}{2S_0^{1/2}} - \frac{\Delta S_0^2}{8S_0^{3/2}} + \ldots \tag{10}$$

Substituting the first order terms of equation 10 into equation 9 yields:

$$\Delta t_0 \sim \left(\frac{m}{eE_0}\right)^{1/2}\left(\frac{\Delta S_0}{S_0^{1/2}}\right) \tag{11}$$

$$\delta = S_0 + \left(\frac{E_1}{E_0}\right)S_1:$$

From equation 6 and substituting $$\Delta t_1 = t_1(S_0) - t_1(S_0 + \Delta S_0) = \left(\frac{m}{2eE_0}\right)^{1/2}\left(\frac{-2S_1}{(\delta + \Delta S_0)^{1/2} + (S_0 + \Delta S_0)^{1/2}} + \frac{2S_1}{\delta^{1/2} + S^{1/2}}\right) \tag{12}$$

Expanding:

$$(\delta + \Delta S_0)^{1/2} \sim \delta^{1/2} + \frac{\Delta S_0}{2\delta_0^{1/2}} - \frac{\Delta S_0^2}{8\delta_0^{3/2}} + \text{----} \tag{13}$$

Substituting the first order terms of equation 13 into equation 12 yields:

$$\Delta t_1 = \left(\frac{m}{2eE_0}\right)^{1/2}\left(\frac{\Delta S_0}{S_0^{1/2}(\delta^{1/2} + \Delta S_0^{1/2})^2}\right)2S_1 \tag{14}$$

From equation 7:

$$\Delta t_D = t_D(S_0) - t_D(S_0 + \Delta S_0) = \left(\frac{m}{2eE_0}\right)^{1/2}\left(\frac{D}{\delta^{1/2}} - \frac{D}{(\delta_0 + \Delta S_0)^{1/2}}\right) \tag{15}$$

Substituting the first order terms from equation 13 yields:

$$\Delta t_D = \left(\frac{m}{2eE_0}\right)^{1/2}\left(\frac{D}{\delta^{1/2}} - \frac{D}{\left(\delta_0^{1/2} + \frac{\Delta S_0}{2\delta^{1/2}}\right)^{1/2}}\right) \sim \left(\frac{m}{2eE_0}\right)^{1/2}\frac{\Delta S_0 D}{\delta^{3/2}} \tag{16}$$

Collecting terms from equations 11, 12 and 16:

$$\Delta t_{tot} = \Delta t_0 + \Delta t_1 + \Delta t_D = \left(\frac{m}{2eE_0}\right)^{1/2}\left(\frac{2S_1}{S_0^{1/2}(\delta^{1/2} + S_0^{1/2})^2} + \frac{D}{2\delta^{3/2}} - \frac{1}{S_0^{1/2}}\right)\Delta S_0 \tag{17}$$

Adding the constraint that the time variation is independent of position $X_0$ (or length $S_0$) yields:

$$\frac{\Delta t_{tot}}{\Delta S_0} = 0 = \left( \frac{2S_1}{S_0^{1/2}(\delta^{1/2} + S_0^{1/2})^2} + \frac{D}{2\delta^{3/2}} - \frac{1}{S_0^{1/2}} \right) \quad (18)$$

Rearranging yields:

$$D = 2\delta^{3/2}\left( \frac{1}{S_0^{1/2}} - \frac{2S_1}{S_0^{1/2}(\delta^{1/2} + S_0^{1/2})^2} \right) \quad (19)$$

This expression allows the choice of geometry parameters D, $S_0$, and $S_1$ and these then define δ and therefore the voltage requirements $E_1/E_0$. Equation 18 is a statement that ions of the same mass that originate at different initial positions $X_0$ in the accumulator 602 will arrive close to the entrance to the detector cell 610 at point $d_{SF}$ at the same time. The plane located at point $d_{SF}$ can be considered to be a space focus plane. By choosing the location of the space focus plane to be coincident with the exit aperture 766 of the ion guide 606, all ions of a given m/z can be at the entrance to the detector cell 610 at the same time. The space focus plane may be made to coincide with the exit aperture 766 by setting the geometry constraints D, $S_0$, and $S_1$ and then using equation 19 to iteratively determine the electric field strengths $E_0$ and $E_1$ implicitly contained in δ (defined above) that will place the space focus plane at this desired axial location. Ions initially located at the entrance of the accumulator 602 will spend more time in the electric field $E_0$ and will experience a larger potential change, and therefore will have a larger velocity than those ions initially located at the exit of the accumulator 602. Therefore after a period of time the ions initially located at the entrance will catch up to the ions initially located at the exit. The second electric field $E_1$ allows both sets of ions to be accelerated to an energy that allows the time required for the ions initially located at the entrance to catch up, i.e. position of the space focus plane, to be chosen over a large range of distances D from the exit $d_1$ of the shutter 604.

Although the location of the space focus plane at point $d_{SF}$ does not place all of the ions in the detector cell 610 at time $t_{tot}$ (as point $d_{SF}$ precedes the detector cell 610), changing the voltages at the axial ends of the decelerator 608 such that $V_2>V_3$ will ensure that ions initially in the region $r_1$ are forced into the detector cell 610 a short time after $t_{tot}$. Stated in another way, the space between $V_2$ and $V_3$ (or the decelerator 608) is not in the detector cell 610, yet it is desired that all ions of a desired mass range originating in the accumulator 602 be injected into the detector cell 610 (i.e., the space between $V_3$ and $V_4$). In accordance with the present teachings, all ions of the desired mass range will eventually be injected into the detector cell 610 and in a very short period of time. This is because at time $t_{tot}$ all ions of the desired mass range have been positioned somewhere between $V_2$ and $V_4$ (i.e., either in the decelerator 608 or in the detector cell 610), and at this time $V_2$ is increased as noted above to push all of the ions presently located in the decelerator 608 into the detector cell 610 and to prevent the low mass ions in the decelerator 608 (the ones that had been reflected in the detector cell 610 and are traveling back toward the space focus plane) from passing back through point $d_{SF}$ and escaping back into the ion guide 606. Because this requires $V_2$ to be greater than $V_3$, any ions in the region between $V_2$ and $V_3$ will be forced back into the region between $V_3$ and $V_4$ due to the electric field formed by the voltage difference between $V_2$ and $V_3$. Once all the ions are between $V_3$ and $V_4$, it is then possible to adjust both $V_3$ and $V_4$ to further compress the ions along the axis into the center of the detector cell 610 (middle electrode segment 756) where they can be excited and detected by means known to persons skilled in the art. Because the ions are trapped in the axial direction by the voltages on $V_2$ and $V_4$ (the ions are always trapped in the radial direction by the magnetic field), the timing of these additional voltage changes is not critical. It will be noted that changing $V_2$ at time $t_{tot}$ such that $V_2>V_3$ is tantamount to switching the first decelerating field $E_{r1}$ to an accelerating field. As conditions can be set such that the large mass ions all reach the space focus plane at the same time, time $t_{tot}$, the large mass ions do not encounter the first decelerating field $E_{r1}$ as it is switched to the accelerating field at this time. The first decelerating field $E_{r1}$ is primarily important for slowing down the low mass ions in a short space so that the time required for them to reach their turning point in the second field region $r_2$ and be reflected back to $V_2$ is maximized. This allows the largest mass range possible to be simultaneously located between $V_2$ and $V_4$.

Low mass ions $m_{low}$, and high mass ions $m_{high}$ will both be focused at the space focus, but at different times. By the time the high mass ions $m_{high}$ reach the space focus plane, the low mass ions $m_{low}$, will have already have passed that point and proceeded into the retarding potential region $E_{r2}$ of the detector cell 610. Once in the retarding region $E_{r2}$ the low mass ions $m_{low}$, will slow down, stop and reverse direction. The condition in which the greatest mass range can be trapped in the detector cell 610 will occur when at time $t_{tot}$ high mass ions $m_{high}$ will be located at the space focus plane and low mass ions $m_{low}$, will also be located there, but traveling in the opposite direction as indicated in FIG. 11. The value of $m_{low}$, relative to $m_{high}$ is determined by $r_1$, $r_2$, $V_3$ and $V_4$. If $r_1$ and $r_2$ could be made arbitrarily large then the mass range that could be simultaneously located between $V_2$ and $V_4$ would be unbounded. However, this would require $E_{r1}$ and $E_{r2}$ to have the same values that they would have for smaller values of $r_1$ and $r_2$. This means that the voltages on $V_2$, $V_3$, and $V_4$ would also have to be arbitrarily large (since the electric field is the voltage difference divided by the length, i.e. $(V_3-V_4)/r_1=E_{r1}$). Thus, there is a practical limit to the dimensions and voltages that can be utilized. For example as the lengths become larger, the finite diameter of the electrodes will cause the field to be more non-uniform. The dimensions of the electrodes of an ICR-type detector cell are also constrained by requirements for ion excitation and detection that are more restrictive than those for ion trapping. Therefore $r_1$ and $r_2$ will generally be determined by detector cell design considerations and the choice of $V_3$ and $V_4$ will be determined by trapping requirement and mass range.

The time $t_{r1}$ required for ions to traverse $r_1$ can be obtained from the change in kinetic energy in the deceleration field $E_{r1}$:

$$\Delta KE = \frac{mv_{r1}^2}{2} - \frac{mv_D^2}{2} = \int_{d_{SF}}^{d_{r1}} eE_{r1}dr = eE_{r1}r_1 \quad (20)$$

$$v_{d_{r1}} = \left( eE_{r1}r_1 + \frac{mv_D^2}{2} \right)^{1/2}\left(\frac{2}{m}\right)^{1/2} \quad (21)$$

$$t_{r1} = \left(\frac{m}{2}\right)^{1/2}\left(\frac{2}{eE_{r1}}\right)\left[\left(eE_{r1}r_1 + \frac{mv_D^2}{2}\right)^{1/2} - \left(\frac{mv_D^2}{2}\right)^{1/2}\right] \quad (22)$$

The time to reach the turning point $t_t$ in region $r_2$ can be also found from the change in kinetic energy in the deceleration field $E_{r2}$ and by recognizing that at the turning point the kinetic energy, (½)$mv_t^2=0$; therefore:

$$\Delta KE = \frac{mv_D^2}{2} = \int_0^{r_t} eE_{r2}dr_2 = eE_{r2}r_t \quad (23)$$

$$\text{and } t_t = \frac{mv_2}{eE_{r2}} \quad (24)$$

Therefore the total time required for an ion to start at $S_o$, travel to the detector cell 610 and be reflected in region $r_2$ and return to the space focus plane is:

$$T_{Total}=t_{tot}+2t_{r1}+2t_t \quad (25)$$

This allows the calculation of the transit times as a function of mass and initial position. By way of example, for system dimensions of:

Electrode Spacing (mm)

| | | |
|---|---|---|
| $S_0$ = | 30.00 | mm |
| $d_0$ = | 60.00 | mm |
| $S_1$ = | 10.00 | mm |
| $L_{Ion\ Guide}$ = | 1200.00 | mm |
| $r_1$ = | 10.00 | mm |
| $r_2$ = | 250.00 | mm |

And voltages of:

Electrode Voltages (Volts)

| | | |
|---|---|---|
| $V_0$ = | 3.00 | volts |
| $V_1$ = | 0.00 | volts |
| $V_2$ = | −9.05 | volts |
| $V_3$ = | 0.2 | volts |
| $V_4$ = | 0.41 | volts |

The electric fields are:

Electric Fields (Volts/mm)

| | | |
|---|---|---|
| $E_0$ = | 0.05 | volt/mm |
| $E_1$ = | 0.905 | volt/mm |
| $E_{r1}$ = | −0.925 | volt/mm |
| $E_{r2}$ = | −0.00084 | volt/mm |

Figure 12:
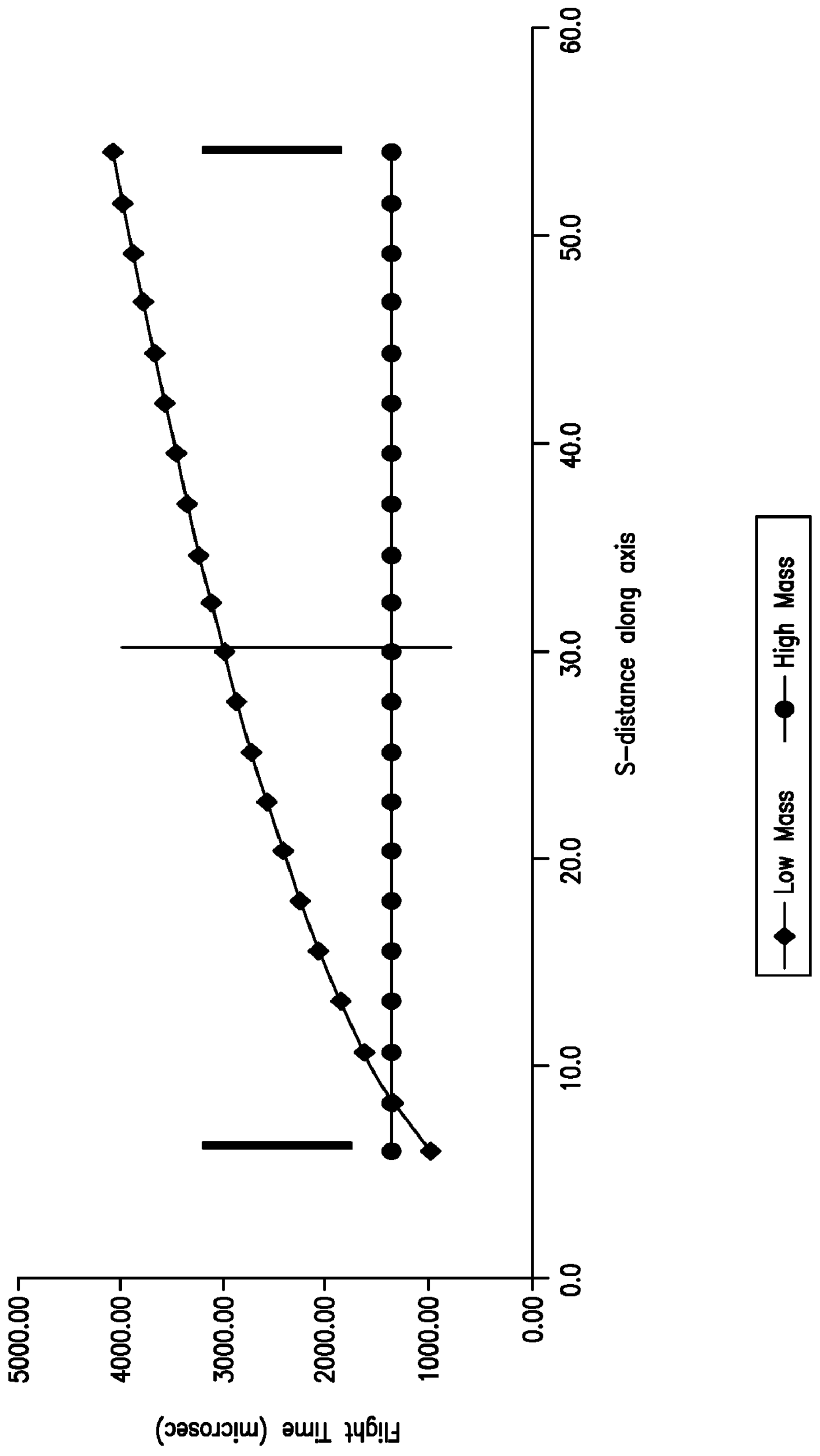
FIG. 12 is a plot of ion flight time through the MS apparatus illustrated in FIG. 11A, as a function of initial axial position for low mass ions and for high mass ions according to an implementation of the present disclosure.

For ions of m/z=2000 originating at $S_0$=30 mm at the center of the accumulator 602, the flight time to the space focus plane is 1366.451 microseconds. For ions of this same high mass originating at the ends of the accumulator 602, $S_0$=6 mm and 54 mm, the flight time is found to be 1356.228 and 1356.717 microseconds respectively for a time difference of 0.489 microseconds. Traveling with a velocity of 1.0053 mm/microsecond, the spatial spread of the ions about the space focus plane is therefore 0.519 mm. The low mass ions, m/z=50 in the present example, travel faster and reach the space focus plane earlier with an average flight time of 203.327 microseconds and proceed to enter the retarding field of the detector cell 610 and are reflected from the repulsive potential back towards the entrance. At the time $t_{tot}$ that the high mass ions have just reached the space focus plane, the low mass ions originating at $S_0$=54 mm at the entrance of the accumulator 602 will have a flight time back to the space focus plane of 4065.022 microseconds, and the low mass ions originating at $S_0$=8.4 mm at the exit end of the accumulator 602 will have a flight time back to the space focus plane of 1364.02 microseconds. This result is shown in FIG. 12, which is a plot of ion flight time through the MS apparatus 600 as a function of initial axial position of the low mass ions and the high mass ions. Hence, it can be seen in this example that all high mass ions originating in the accumulator 602 located between $S_0$=6 and 54 mm will be trapped and low mass ions between $S_0$=8.4 and 54 mm will be trapped when the detector cell potentials are readjusted such as shown, for example, in FIG. 5.

It will be understood that the methods and apparatus described in the present disclosure may be implemented in an ion processing system such as an MS system as generally described above by way of example. The present subject matter, however, is not limited to the specific ion processing systems illustrated herein or to the specific arrangement of circuitry and components illustrated herein.

In general, terms such as "communicate" and "in . . . communication with" (for example, a first component "communicates with" or "is in communication with" a second component) are used herein to indicate a structural, functional, mechanical, electrical, signal, optical, magnetic, electromagnetic, ionic or fluidic relationship between two or more components or elements. As such, the fact that one component is said to communicate with a second component is not intended to exclude the possibility that additional components may be present between, and/or operatively associated or engaged with, the first and second components.

It will be understood that various aspects or details of the invention may be changed without departing from the scope of the invention. Furthermore, the foregoing description is for the purpose of illustration only, and not for the purpose of limitation—the invention being defined by the claims.

What is claimed is:

1. A method for filling an ion detector cell, the method comprising:

transmitting a plurality of ions, initially trapped in a linear-geometry ion accumulator, from the ion accumulator to a shutter device by applying a first axial electric accelerating field across an axial length of the ion accumulator;

transmitting the ions through the shutter device and into a linear-geometry ion guide by applying a second axial electric accelerating field across an axial length of the shutter device, wherein the second axial electric accelerating field is defined by a voltage difference between two electrodes spaced apart by the axial length of the shutter device, and the second axial electric accelerating field is applied at the same time as the first axial electric accelerating field;

transmitting the ions through the ion guide and into an ion decelerator comprising a first electrode and a second electrode spaced from the first electrode by an axial length of the decelerator;

decelerating at least some of the ions while transmitting the ions through the decelerator and into the ion detector cell by applying a first axial electric decelerating field across an axial length of the decelerator, wherein the first axial electric decelerating field is defined by a voltage difference between the first electrode and the second electrode; and decelerating at least some of the ions in the ion detector cell by applying a second axial electric decelerating field across an axial length of the ion detector cell.

2. The method of claim 1, further comprising maintaining the ion guide in an axial electric field-free state over an axial length thereof while transmitting the ions through the ion guide.

3. The method of claim 1, wherein applying the first axial electric accelerating field comprises applying a plurality of DC voltages to a plurality of axially spaced conductive segments of the accumulator.

4. The method of claim 1, further comprising applying the first accelerating field at a first field strength, applying the second accelerating field at a second field strength, and selecting the first field strength and the second field strength based on the axial lengths of the ion accumulator, the shutter device and the ion guide.

5. The method of claim 4, wherein selecting the first field strength and the second field strength is based on the following equation:

$$D = 2\delta^{3/2}\left(\frac{1}{S_0^{1/2}} - \frac{2S_1}{S_0^{1/2}(\delta^{1/2} + S_0^{1/2})^2}\right), \text{ where } \delta = S_0 + \left(\frac{E_1}{E_0}\right)S_1,$$

$S_0$ is an axial distance from the initially trapped ions to an end of the accumulator adjacent to the shutter device, $S_1$ is the axial length of the shutter device, D is the axial length of the ion guide, $E_0$ is the first field strength, and $E_l$ is the second field strength.

6. The method of claim 1, wherein the plurality of ions initially trapped in the ion accumulator comprise a plurality of ions of same mass located at different initial axial positions in the ion accumulator, and further comprising:

applying the first accelerating field at a first field strength;

applying the second accelerating field at a second field strength; and selecting the first field strength, the second field strength, and the axial lengths of the ion accumulator, the shutter device and the ion guide, such that all of the ions of same mass at any initial axial position are transmitted to the ion detector cell at the same time.

7. The method of claim 6, wherein applying the first accelerating field at the first field strength and applying the second accelerating field at the second field strength transmits all of the ions of same mass at any initial axial position to a space focus plane at the same time, and the space focus plane is located at an axial position between the ion guide and the ion detection cell.

8. The method of claim 7, further comprising positioning the space focus plane at an exit aperture of the ion guide.

9. The method of claim 7, wherein applying the first accelerating field at the first field strength and applying the second accelerating field at the second field strength transmits all of the ions of same mass to the space focus plane at a time $t_{tot}$, and further comprising, at the time $t_{tot}$, changing the first decelerating field to a third axial electric accelerating field applied over the axial length of the decelerator to transmit the ions at the space focus plane and any ions between the space focus plane and the ion detector cell into the ion detector cell.

10. The method of claim 1, wherein the plurality of ions initially trapped in the ion accumulator comprise a plurality of ions of a highest mass desired to be trapped in the ion detector cell and a plurality of ions of a lowest mass desired to be trapped in the ion detector cell, and further comprising:

applying the first accelerating field at a first field strength;

applying the second accelerating field at a second field strength; and selecting the first field strength, the second field strength, and the axial lengths of the ion accumulator, the shutter device and the ion guide, such that at a time $t_{tot}$, all of the ions of highest mass have been transmitted at the same time $t_{tot}$ to a space focus plane axially located between the ion guide and the ion detector cell, and at the time $t_{tot}$ the ions of lowest mass have passed through the space focus plane, have entered the ion detector cell, and have been reflected back toward the space focus plane by the second decelerating field.

11. The method of claim 10, further comprising, at the time $_{tot}$, changing the first decelerating field to a third axial electric accelerating field applied over the axial length of the decelerator to transmit the ions of highest mass and lowest mass, located at the space focus plane and between the space focus plane and the ion detector cell, into the ion detector cell.

12. The method of claim 1, further comprising changing the first decelerating field to a third axial electric accelerating field applied over the axial length of the decelerator to transmit ions through the decelerator and into the ion detector cell.

13. A mass spectrometer apparatus, comprising:

a linear-geometry ion accumulator arranged along an axis and configured for applying a first axial electrical accelerating field across an axial length of the ion accumulator;

a shutter device axially succeeding the ion accumulator and configured for applying a second axial electrical accelerating field across an axial length of the shutter device;

a linear-geometry ion guide axially succeeding the shutter device;

an ion decelerator axially succeeding the ion guide and comprising a first electrode having an aperture on the axis and a second electrode having an aperture on the axis and axially spaced from the first electrode, wherein the ion decelerator is configured for applying a first axial electric decelerating field between the first electrode and the second electrode; and an ion detector cell axially succeeding the ion decelerator and configured for applying a second axial electrical decelerating field across an axial length of the ion detector cell.

14. The mass spectrometer apparatus of claim 13, wherein the ion accumulator comprises a plurality of axially spaced electrically conductive segments, and further comprising means for applying DC voltages to the conductive segments.

15. The mass spectrometer apparatus of claim 13, wherein the first electrode and the second electrode comprise mesh grids.

16. The mass spectrometer apparatus of claim 13, wherein the ion accumulator is configured for applying the first accelerating field at a first field strength and the shutter device is configured for applying the second accelerating field at a second field strength, and wherein the first field strength and the second field strength have respective values that cause all ions of a same given mass initially trapped in the accumulator to be transmitted to an exit of the ion guide at the same time.

17. The mass spectrometer apparatus of claim 13, wherein the axial length of the accumulator, the axial length of the shutter device, and an axial length of the ion guide have respective values that cause all ions of a same given mass initially trapped in the accumulator to be transmitted to an exit of the ion guide at the same time in response to activation of the first accelerating field and the second accelerating field.

18. The mass spectrometer apparatus of claim 13, further comprising means for switching the first decelerating field to a third accelerating field.

* * * * *

UNITED STATES PATENT AND TRADEMARK OFFICE

CERTIFICATE OF CORRECTION

PATENT NO. : 8,309,911 B2
APPLICATION NO. : 12/547335
DATED : November 13, 2012
INVENTOR(S) : Gregory J. Wells It is certified that error appears in the above-identified patent and that said Letters Patent is hereby corrected as shown below:

In column 19, line 41, in Claim 5, delete "$E_l$" and insert -- $E_1$ --, therefor.

In column 20, line 25, in Claim 11, delete "$_{tot}$," and insert -- $t_{tot}$, --, therefor.

Signed and Sealed this
Twenty-ninth Day of January, 2013

David J. Kappos
*Director of the United States Patent and Trademark Office*